United States Patent [19]
Froelich

[11] Patent Number: 4,763,190
[45] Date of Patent: Aug. 9, 1988

[54] DIGITAL COLOR CORRECTION CIRCUIT

[75] Inventor: Ronald W. Froelich, Covina, Calif.

[73] Assignee: Xerox Corporation, Stamford, Conn.

[21] Appl. No.: 880,241

[22] Filed: Jun. 30, 1986

[51] Int. Cl.$^4$ .............................................. G03F 3/08
[52] U.S. Cl. ........................................ 358/79; 358/80
[58] Field of Search .............................. 358/79, 80, 75

[56] References Cited

U.S. PATENT DOCUMENTS

| | | | |
|---|---|---|---|
| 3,555,262 | 1/1971 | Shimada | 358/79 X |
| 4,335,398 | 6/1982 | Yamada | 358/80 |
| 4,402,007 | 8/1983 | Yamada | 358/80 X |
| 4,476,487 | 10/1984 | Klie et al. | 358/80 |
| 4,482,917 | 11/1984 | Gaulke et al. | 358/80 |
| 4,486,772 | 12/1984 | Klie et al. | 358/80 |
| 4,631,578 | 12/1986 | Sasaki et al. | 358/80 |
| 4,636,844 | 1/1987 | Sasaki | 358/80 |
| 4,649,423 | 3/1987 | Hoffrichter et al. | 358/80 |
| 4,656,505 | 4/1987 | Yamada et al. | 358/80 |
| 4,682,216 | 7/1987 | Sasaki et al. | 358/79 |

FOREIGN PATENT DOCUMENTS

| | | | |
|---|---|---|---|
| 0084228 | 7/1983 | European Pat. Off. | 358/80 |
| 59-072869 | 4/1984 | Japan | 358/80 |
| 60-043968 | 3/1985 | Japan | 358/80 |
| 60-132463 | 7/1985 | Japan | 358/80 |
| 60-236576 | 11/1985 | Japan | 358/80 |

Primary Examiner—John W. Shepperd
Assistant Examiner—E. Anne Faris
Attorney, Agent, or Firm—Robert E. Cunha

[57] ABSTRACT

This color copying system scans the original with a raster input scanner to generate digital signals representing red, green and blue, and prints at a raster output scanner which uses cyan, magenta, yellow and black ink. In addition, under color removal is used, that being defined as the removal of a certain amount of ink from all three colors, and the addition of an equivalent amount of black ink. The first step is to convert the input scanner colors into the color being printed during the current revolution of the printing drum. This requires the solution of three equations, each of which use three look-up RAM tables. In addition, the amount of under color removal must also be calculated before the amount of ink for the dot being printed is known. This requires an additional table look-up. Finally, for the black cycle, the amount of black ink must be calculated, requiring another table. The resultant circuit, therefore, consists of nine RAM tables for the color equations, each of which is reloaded with new values at the beginning of each color printing revolution, two black tables, and the associated circuitry to perform the associated computations and to establish the synchronization and timing to allow the system to operate at reasonable speeds.

3 Claims, 37 Drawing Sheets

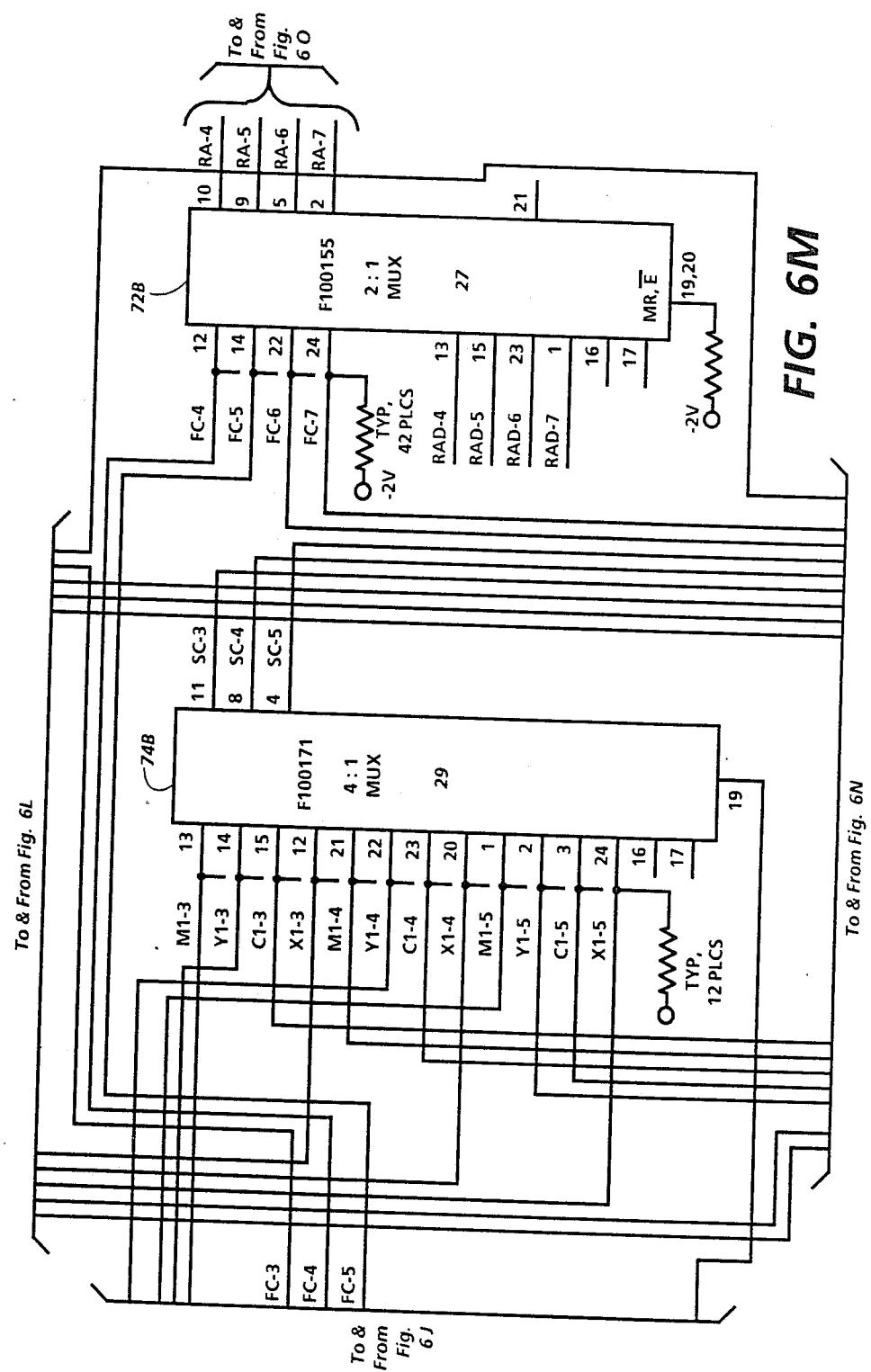

DIGITAL COLOR CORRECTION CIRCUIT

BACKGROUND OF THE INVENTION

This invention is a circuit for the high speed translation of the output signals of a color raster input scanner (RIS) into signals representing amounts of colored inks to allow the production of an accurate color circuit specifically comprising a set of look-up tables for the conversion of the red, green and blue inputs from the RIS to the cyan, magenta, yellow and black output of the ROS.

Color copiers may convert the scanned input signals into color copies, but the colors are only approximate over the total range of densities.

The accurate translation from red, green and blue to cyan, magenta, yellow and black is known mathematically, but has required extensive memory and computer power to accomplish. Cyan is computed as a constant times red minus a constant times green minus a constant times blue. Similarly, magenta is a function of green, red and blue, and yellow is a function of blue, red and green.

A complicating factor is that, for the best color rendition, a process known in the industry as "under color removal" is also required. Simply stated, the process is to first find which of the three output colors is using the least ink. For a numerical example, assume that the output scanner has computed an output comprising one and a half units of cyan ink, three units of magenta and three units of yellow. Then the least ink is one and one half units. The next step is to subtract a fraction of that amount of least ink from all three colors, and substitute an equal amount of black ink. In the numerical example, assume that the amount of color removed is seven tenths of the color over an original threshold of one half a unit. Then 0.7 units of ink will be removed from each color, and 0.7 units of black ink will be used. Therefore, the final amounts of ink will be 0.8 units of cyan, 2.3 units of magenta, 2.3 units of yellow and 0.7 units of black. It is only after this computation is accomplished that the amount of any color ink is known.

In a raster output scanner, this represents an extensive amount of computation for each dot printed, in that the three output colors and the amount of under color removal must all be determined before the amount of ink for the dot being printed can be determined. In a four color system, the computation time will slow down the printing rate.

What is required is a relatively economical circuit that will accomplish this entire conversion at standard printer operating speeds.

SUMMARY OF THE INVENTION

To accomplish each function (cyan, magenta and yellow), a circuit comprising three color tables stored in RAM is provided. Each look-up table is 256 words to provide a smooth conversion over the range of values. Also, two summing devices are used to subtract the two negative values from the positive term.

The under color removal is then computed by determining, in a set of comparators, which color has the least ink. An additional look-up table is used to determine the actual amount of ink removed, a summing circuit performs the subtraction, and the actual amount of ink to be used in finally determined. The circuit is arranged in the form of a pipe line so that the entire computation for each spot can take place at reasonable real-time speeds.

Since all colors (cyan, magenta and yellow) must be calculated to determine the amount of under color removal, and since each color requires three look-up tables, it is seen that there must be nine RAM color tables in the entire circuit.

The system is also implemented so that the amount of ink used during the black cycle may be more or less than the amount of color ink removed during the color cycles. Therefore, two additional RAM tables are required, one for color ink removal and one for the amount of black ink to be used.

DETAILED DESCRIPTION OF THE INVENTION

Figure 1:
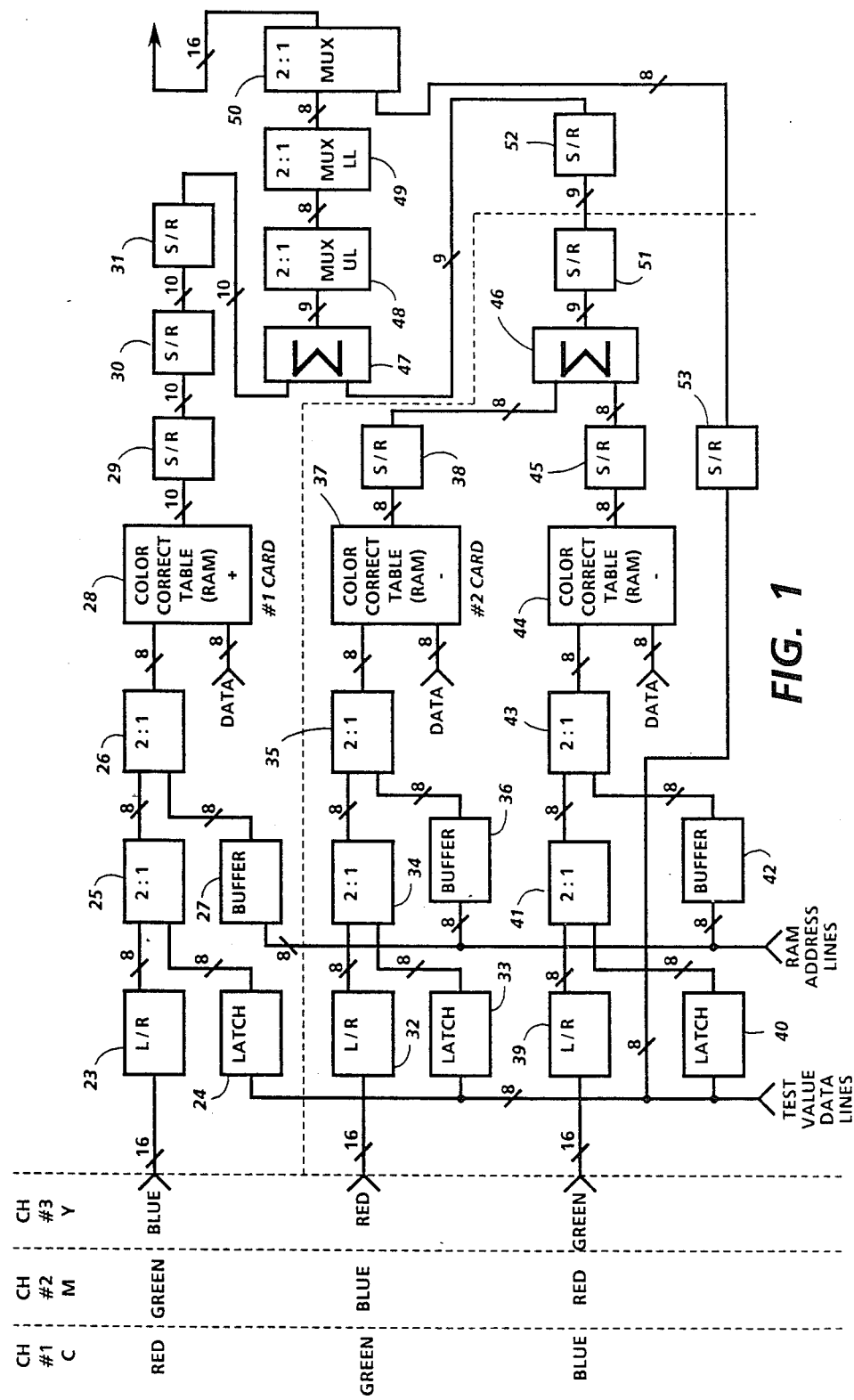
FIG. 1 is a block diagram of the circuit for calculating the color corrections.

There are three identical boards in the system for color translation, one of which is shown in FIG. 1. Channel #1, as shown in the left edge of the figure, processes cyan as a function of red, green and blue, channel #2 processes magenta as a function of green, blue and red, and channel #3 generates yellow as a function of blue, red and green. During this description, it will be assumed that channel #1 is being discussed.

The three inputs are signals which are functions of red, green and blue, as shown. Also, before the scan starts, the three tables 28, 37 and 44 are loaded with constants, 256 constants in each table, each constant 8 bits in length. Since there are three color revolutions per copy, the tables are reloaded before each revolution of the printing drum to load the current table values. There are thus a total of 27 sets of color values that are periodically loaded into the nine tables, nine at a time at the beginning of each of three color revolutions, plus two sets of black values.

In FIG. 1, as shown in the upper left corner of the diagram, an eight bit differential digital signal being carried on sixteen lines, respresenting the amount of red the RIS has picked up, is coupled to a first latch/register 23 which is used as a buffer. The output is coupled to a 2:1 multiplexer 25 which can select either this red signal or a data test value from latch 24. Assuming regular operation, the output of the multiplexer 25 is coupled to the next multiplexer 26 which selects the red signal from multiplexer 25. When the RAM is loaded at the start of each color revolution the address is forced on the RAM IC through this buffer along with the constant on the RAM data input lines to create a table in RAM. In a test mode there also will be an address from a buffer 27, coupled to the RAM 28. Finally, the signal is applied to the RAM, a 256 by 8 bit memory that will output the red table output term. The next three shift registers 29, 30 and 31 are inserted in the path for timing purposes.

Simultaneously, the green input is applied in a similar manner to circuit elements 32 through 38, and a blue input is applied to circuit elements 39 through 45. The bottom two parts of the circuit are configured so that the outputs are negative values which are added in summer 46 to give a negative value. Then, this negative value is added to the positive output of shift register 31 in summer 47 to give a value of cyan, which is coupled through multiplexers 48, 49 and 50 to become the board output for cyan. The first multiplexer 48 is configured to prevent underflow, and the second 49 is to prevent overflow. That is to say, large negative values are prevented from becoming more negative and finally underflowing to become a large positive number, and large positive numbers are prevented from increasing to an overflow and becoming a large negative number. The final multiplexer 50 selects between a test value or this final cyan value. Shift registers 51, 52, 29, 20 and 31 are provided to adjust the timing between circuit paths.

Figure 2:
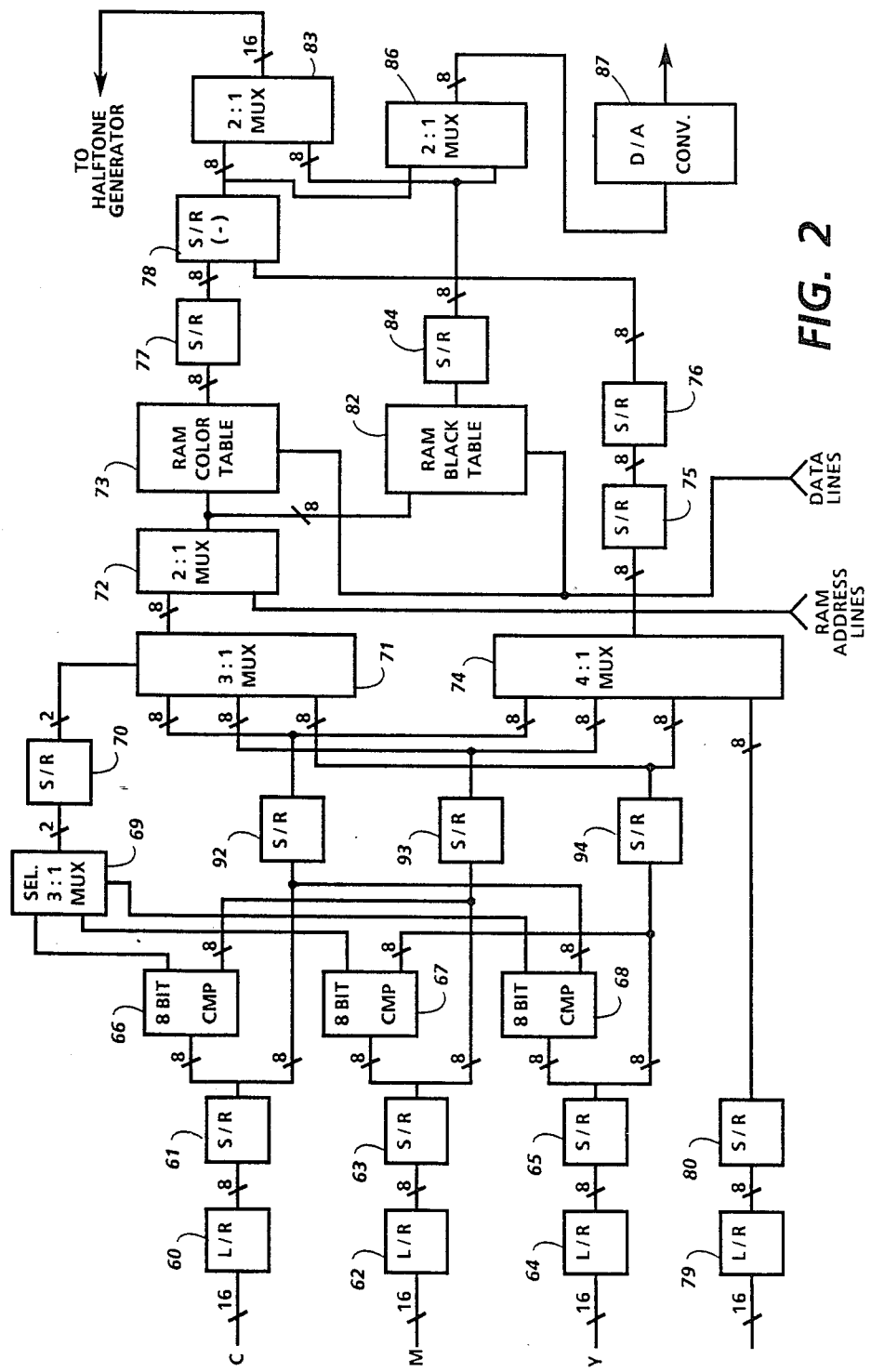
FIG. 2 is a block diagram of the circuit used for under color removal.

Two identical circuit boards generate magenta and yellow signals, and all three are applied to the under color removal circuit of FIG. 2. The cyan signal is applied through line receiver 60 and register 61 to comparators 66 and 68. The magenta signal is applied through line receiver 62 and register 63 to comparators 67 and 66. and the yellow signal is applied through line receiver 64 and register 65 to comparators 68 and 67. In each case the comparators will couple out an indication of which of its two inputs has the higher value, which corresponds to the least ink. In all cases, the identity of the higher source is coupled to the selector 69 which identifies the source of the highest value, the least ink value, through register 70 to the 3:1 multiplexer 71. At the same time, the cyan, magenta and yellow values are respectively coupled through registers 92, 93 and 94 to the same multiplexer 71. When the identity of the least ink channel is coupled to the multiplexer 71, it selects the corresponding output of one of the three registers 92, 93 or 94. Thus, the highest value is coupled through the multiplexer 71, through multiplexer 72 (which is used to coupled addresses to the RAM 73 during the loading of table values) to the color table contained in RAM 73. The multiplexer 72 serves the same basic functions as the multiplexers 26, 35 and 43 for the color tables. This table has values which relfect both the threshold and factor for color removal, and therefore represents the amount of ink that should be removed.

At the same time, original color values are also applied to a 4:1 multiplexer 74. The color that is being printed during the current revolution of the printer drum (cyan, magenta, yellow or black) is selected. The current color, coupled through registers 75 and 76 and the color to be removed coupled through register 77 are applied to negative adder 78 which performs the subtraction to produce the amount of ink to be used for the current spot to be printed. This is coupled out to the printer by multiplexer 83.

During the black printing revolution, it may be that the amount of black ink actually used is more or less than the amount of color removed from the three color channels. This multiplier factor is controlled by the table in the Ram 82, the output of which is selected by the multiplexer 83 during solid color printing cycles.

The path along the bottom of the Figure through line receiver 79 and register 80 is used for solid color computer generated graphics only, and the RAM color tables 73 and 82 are not used. In a test mode, the output can be coupled through multiplexer 86 and converted to analog by converter 87 so that it can be viewed on an oscilloscope.

Figure 3:
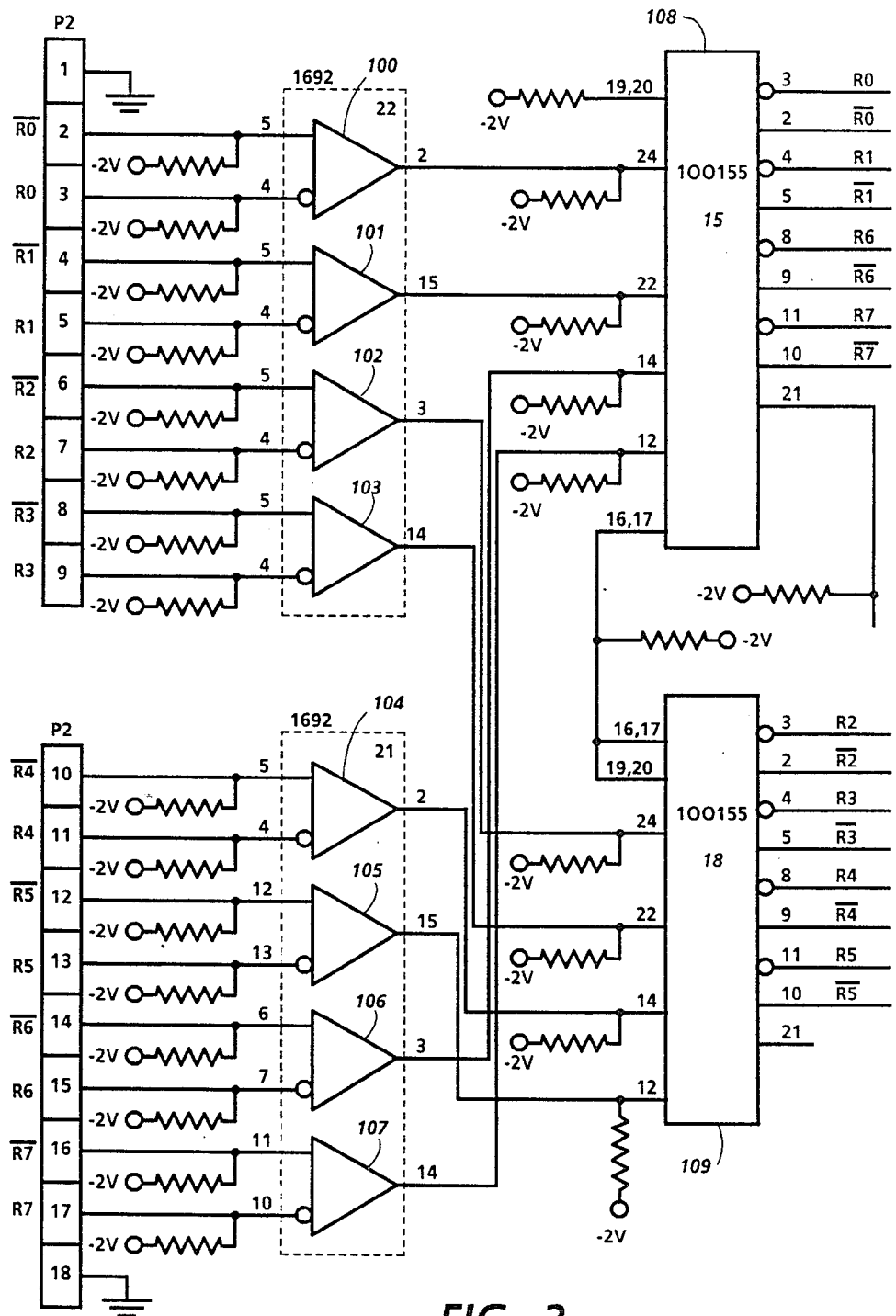
FIGS. 3, 4A–4E and 5A–5F are a schematic diagrams of the color translation boards.
Figure 4A:
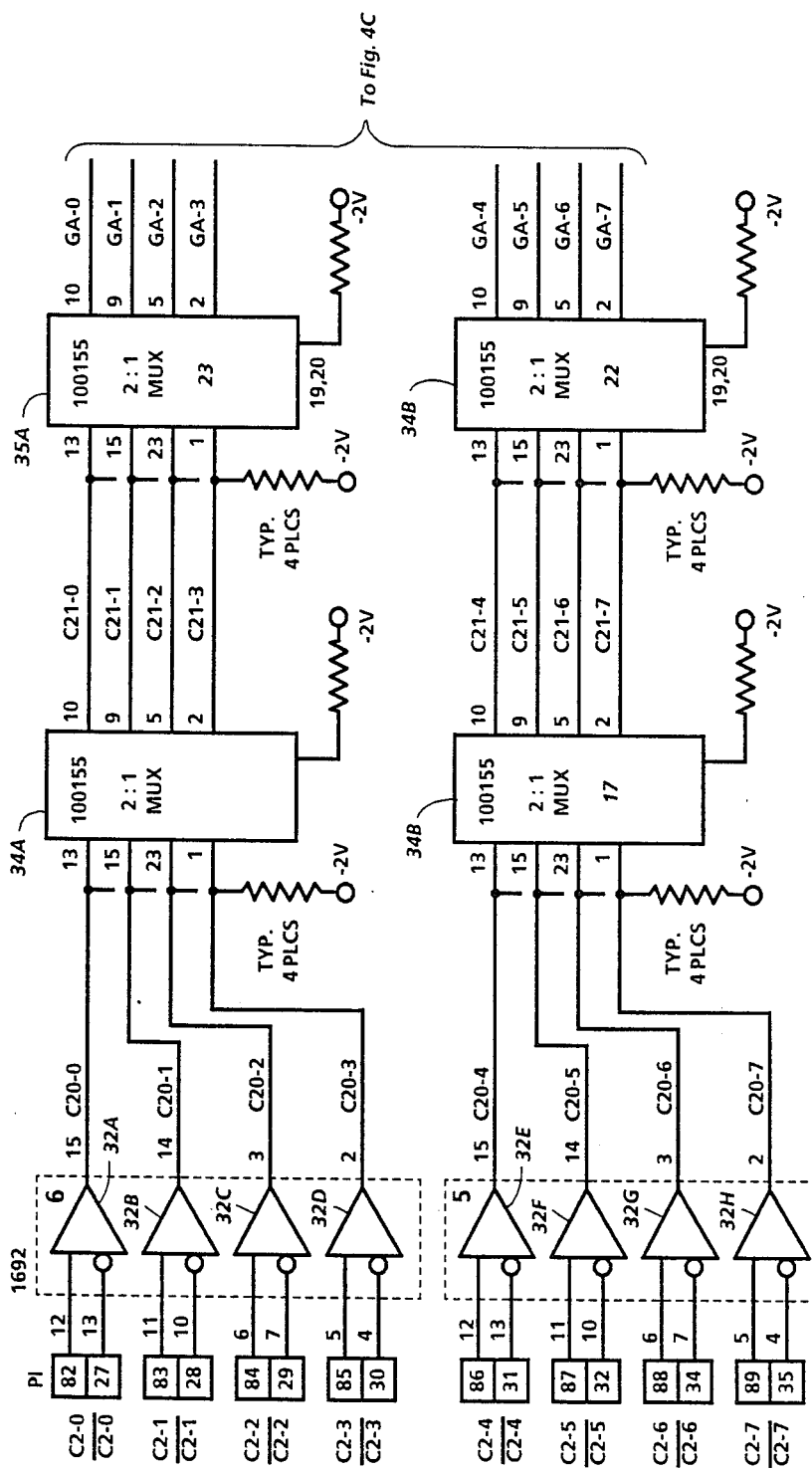
Figure 4B:
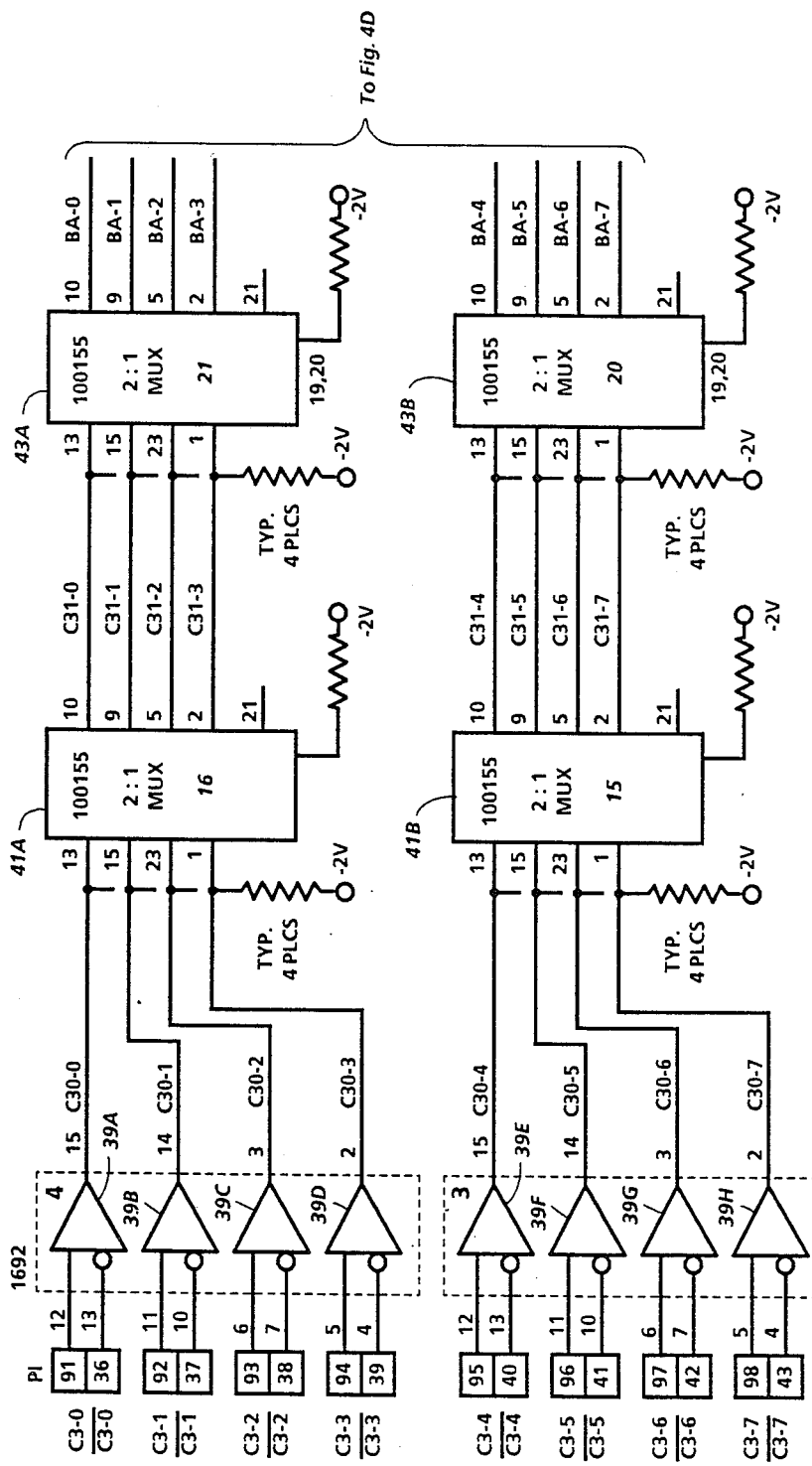
Figure 4C:
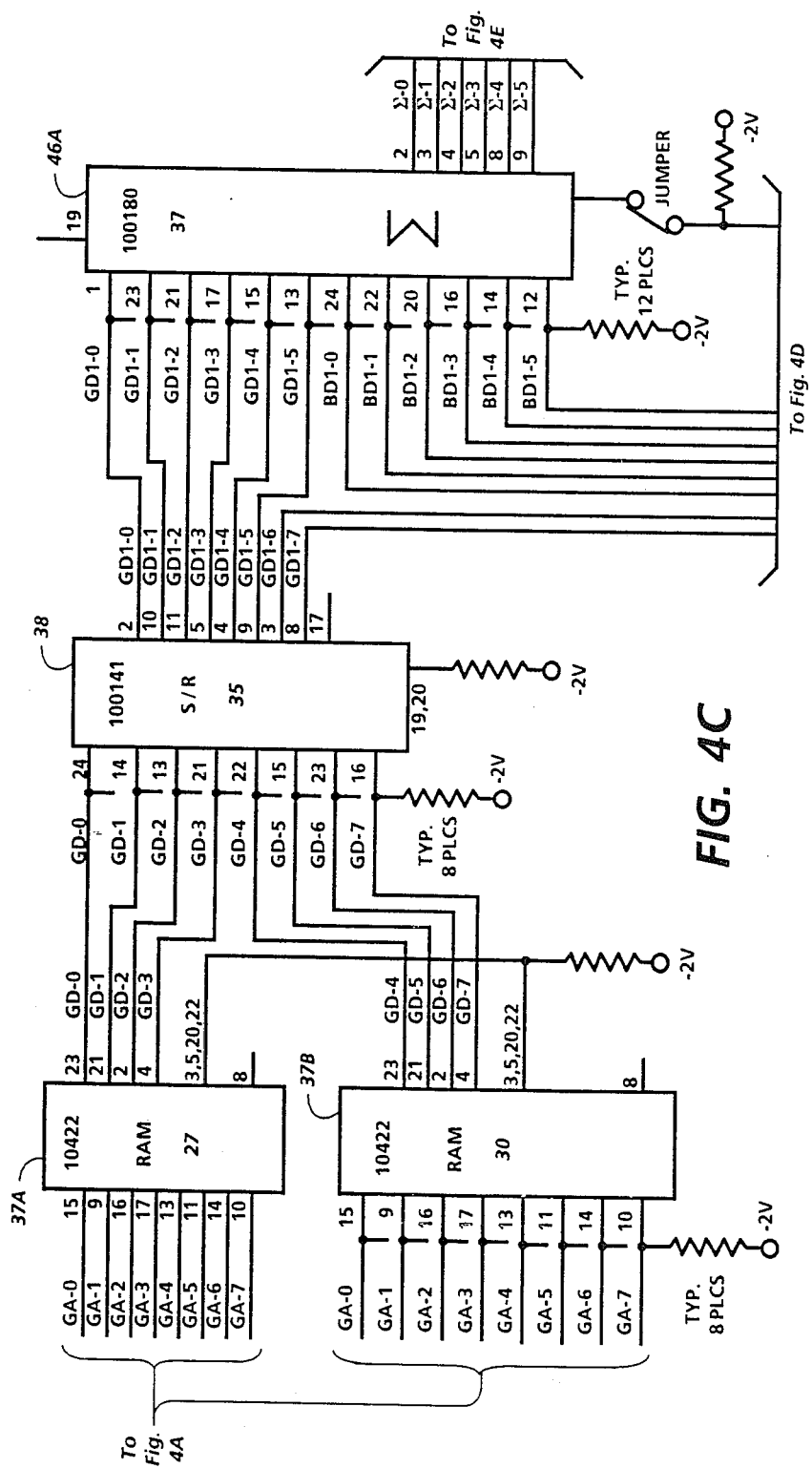
Figure 4D:
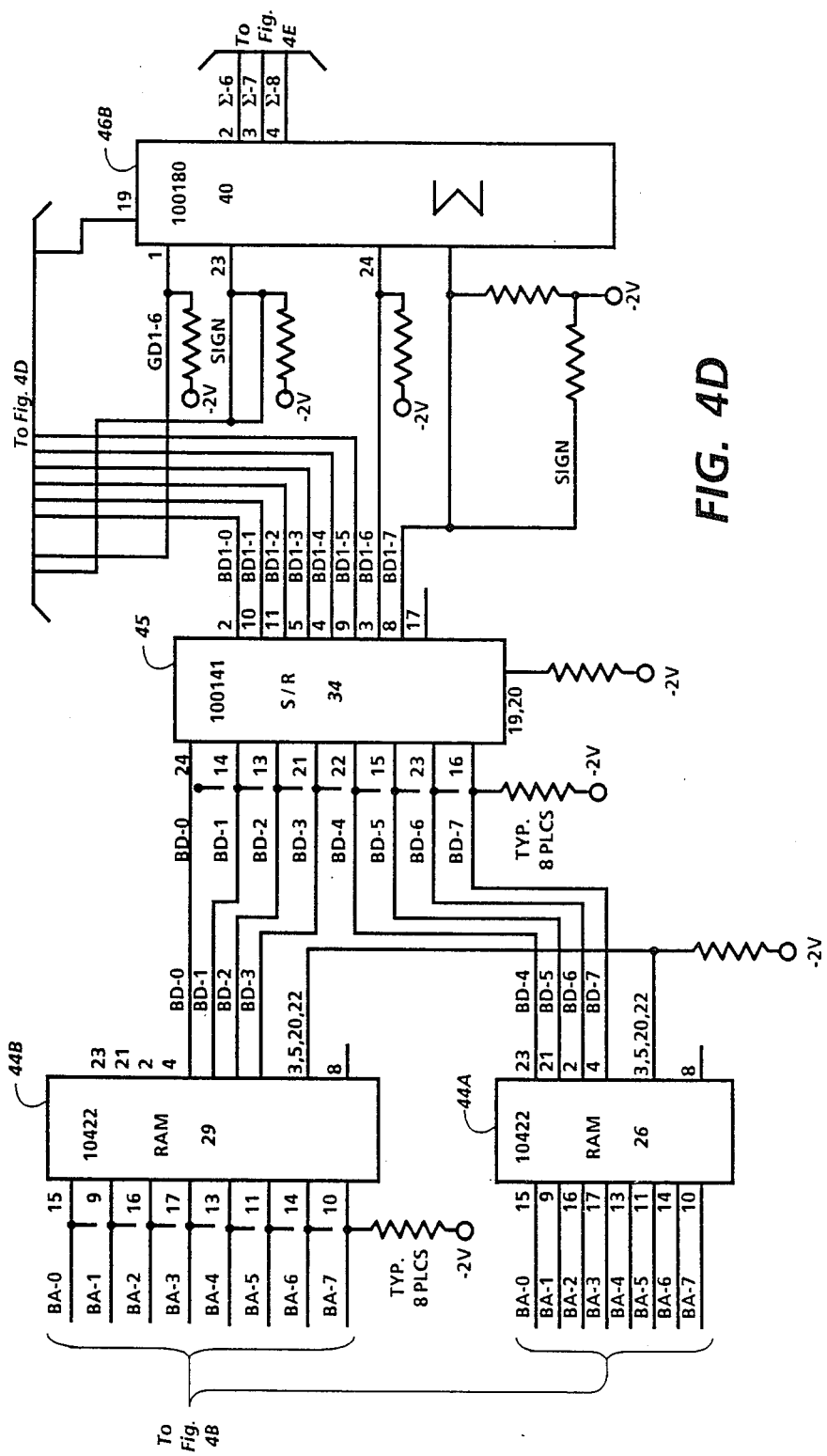
Figure 4E:
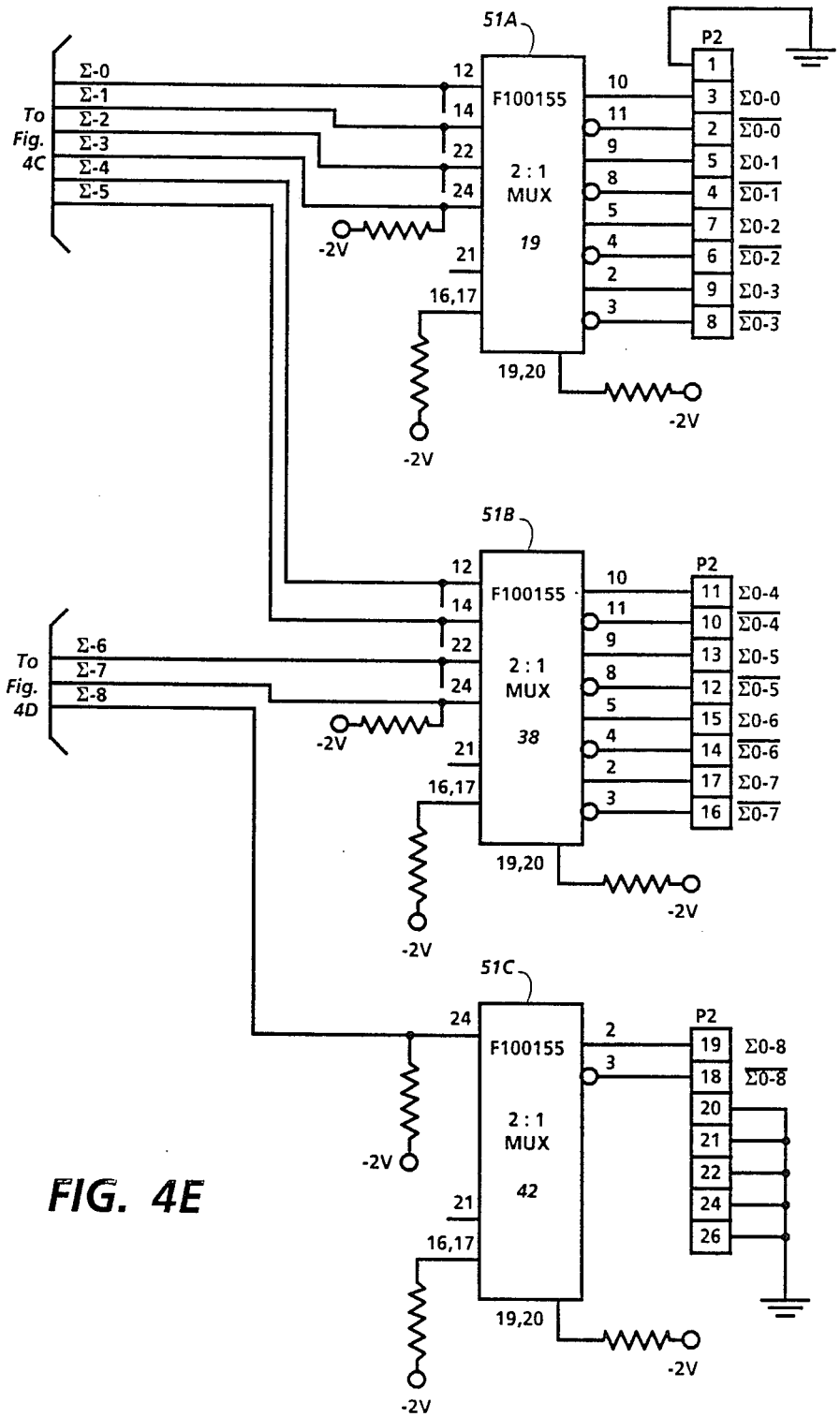
Figure 5A:
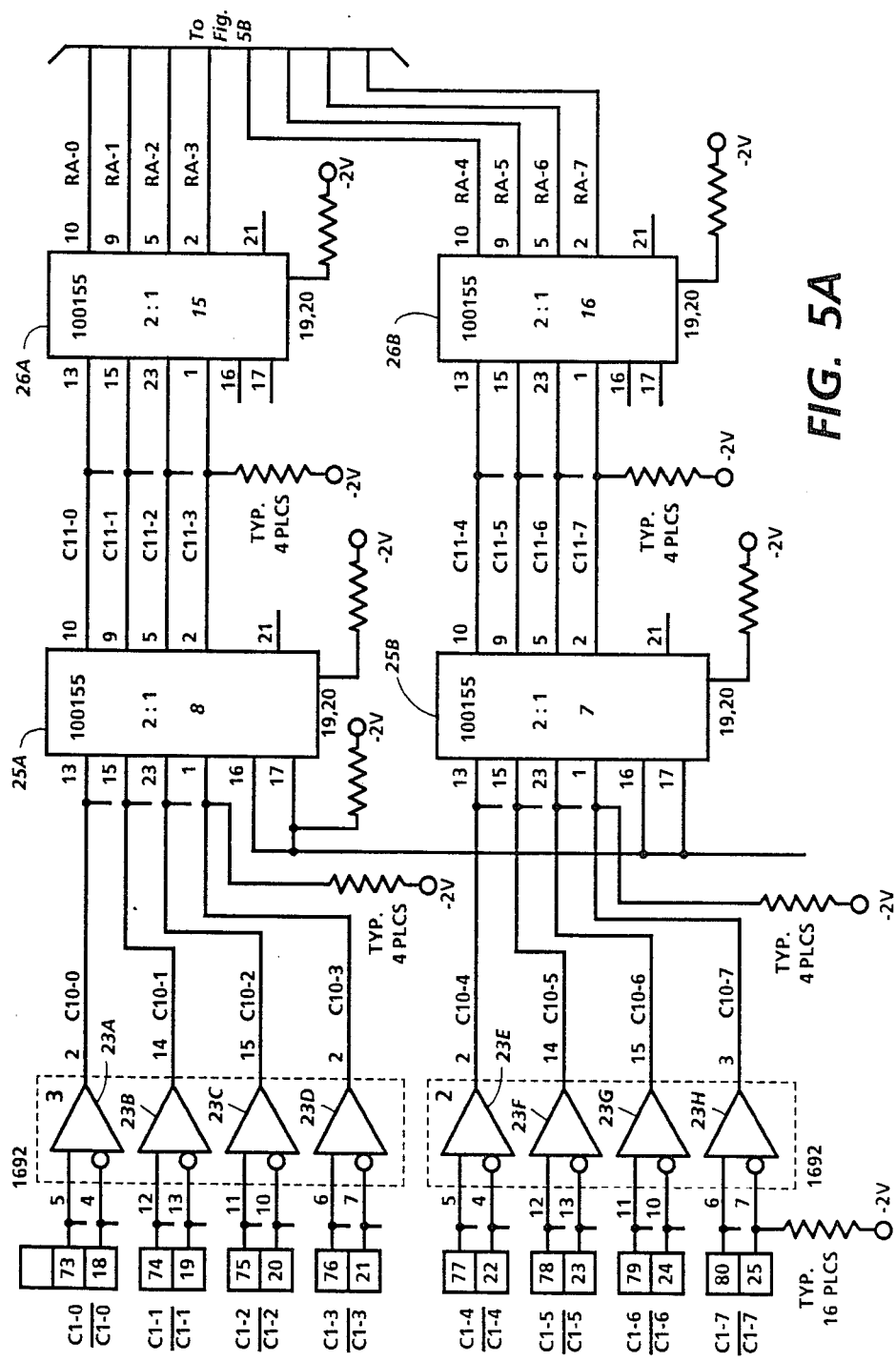
Figure 5B:
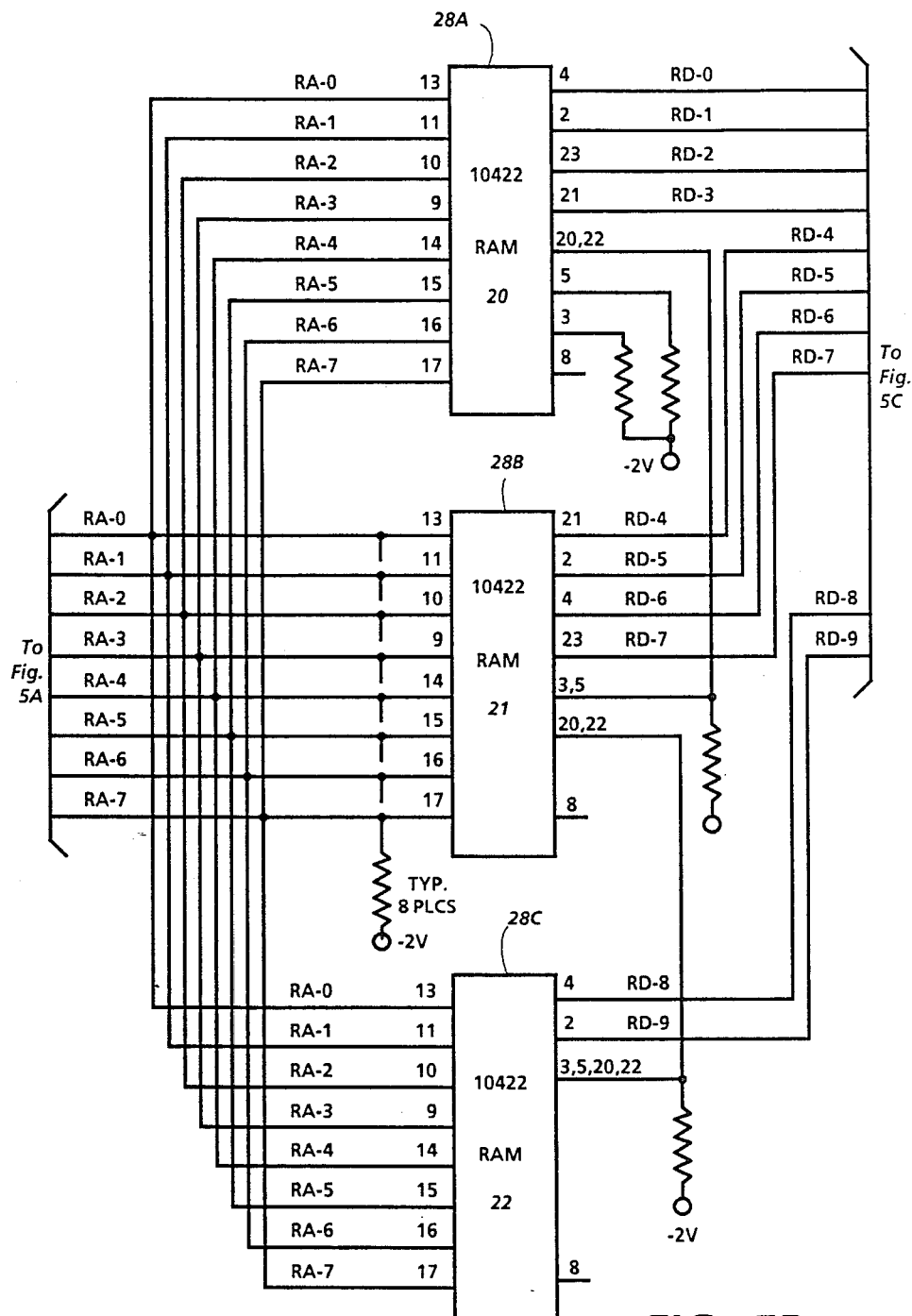
Figure 5C:
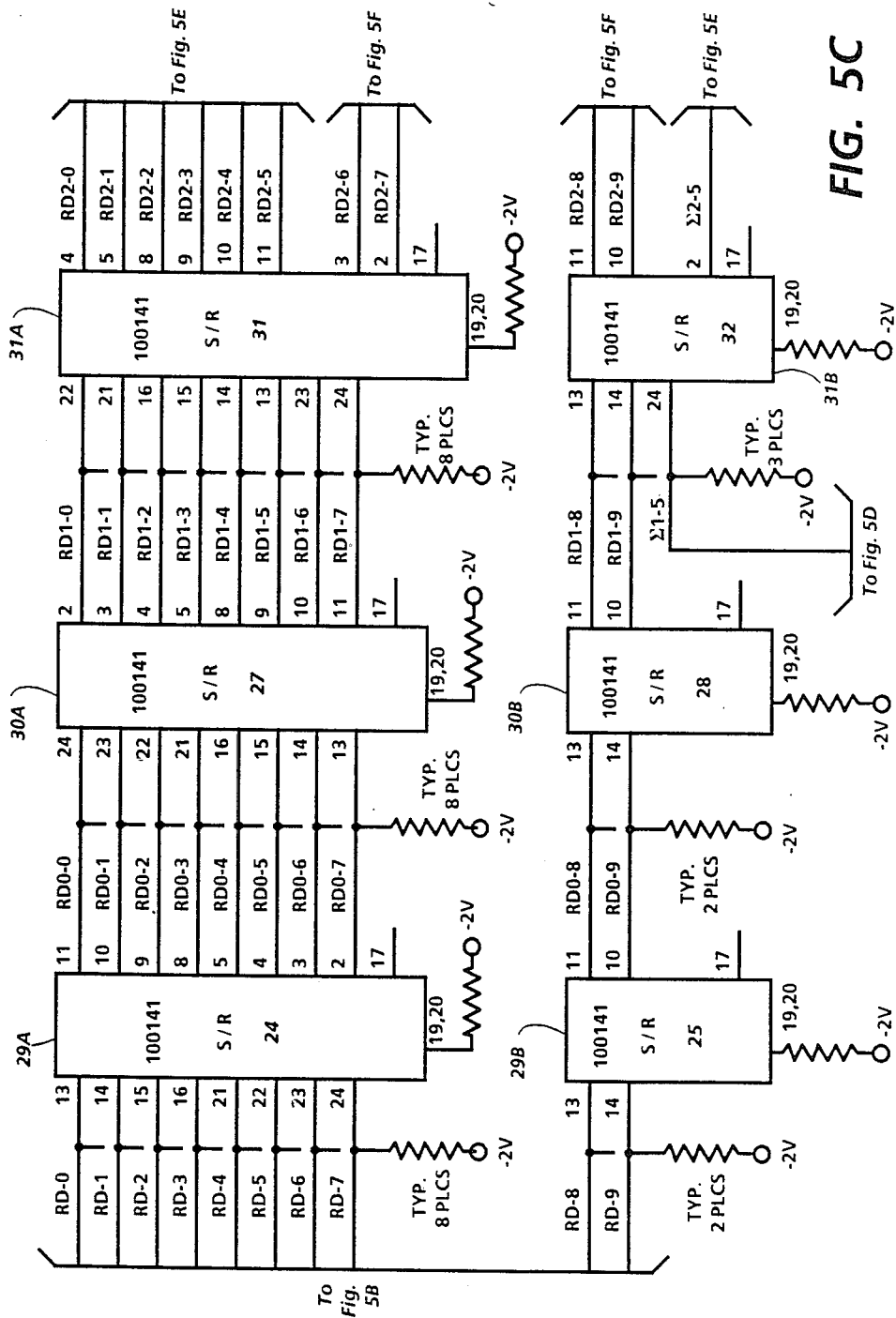
Figure 5D:
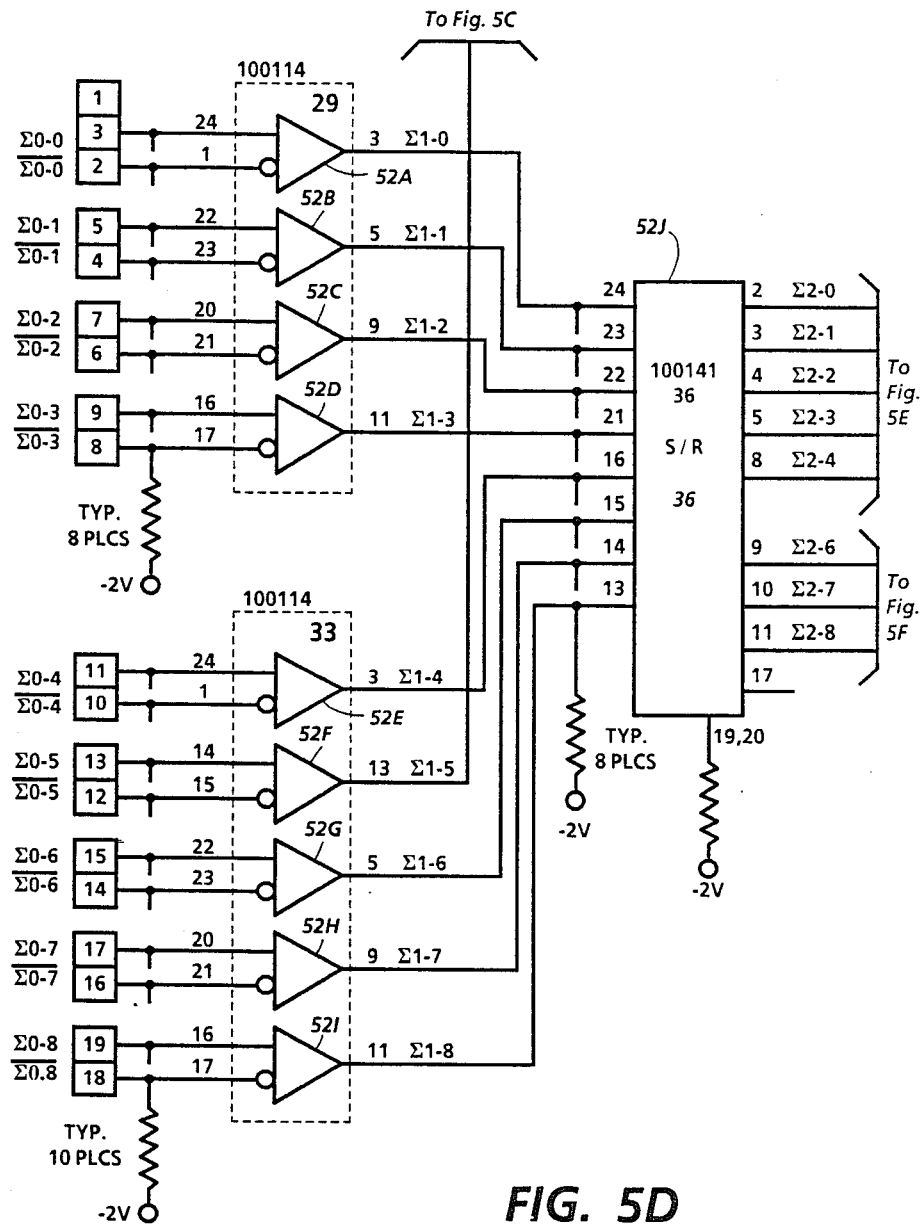
Figure 5E:
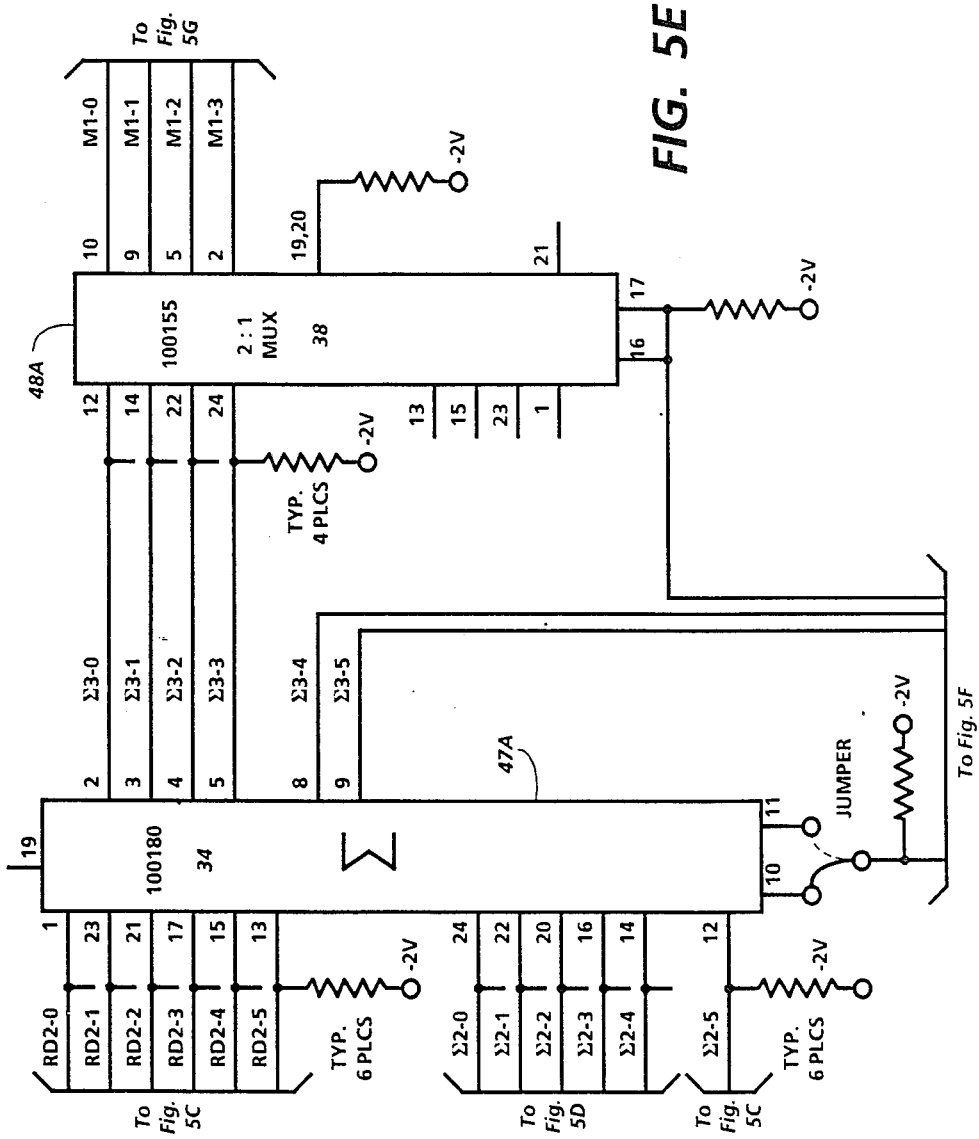
Figure 5F:
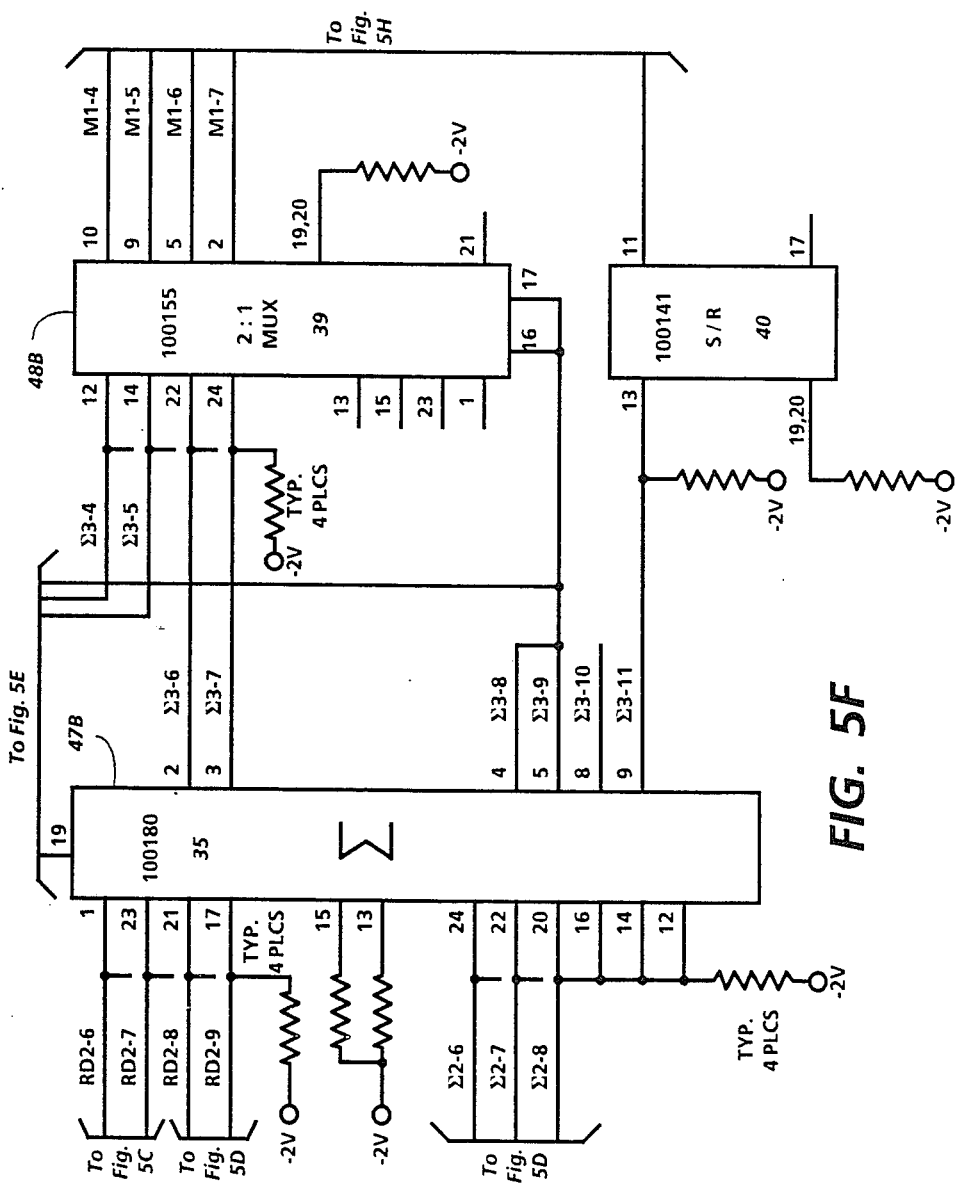
Figure 5G:
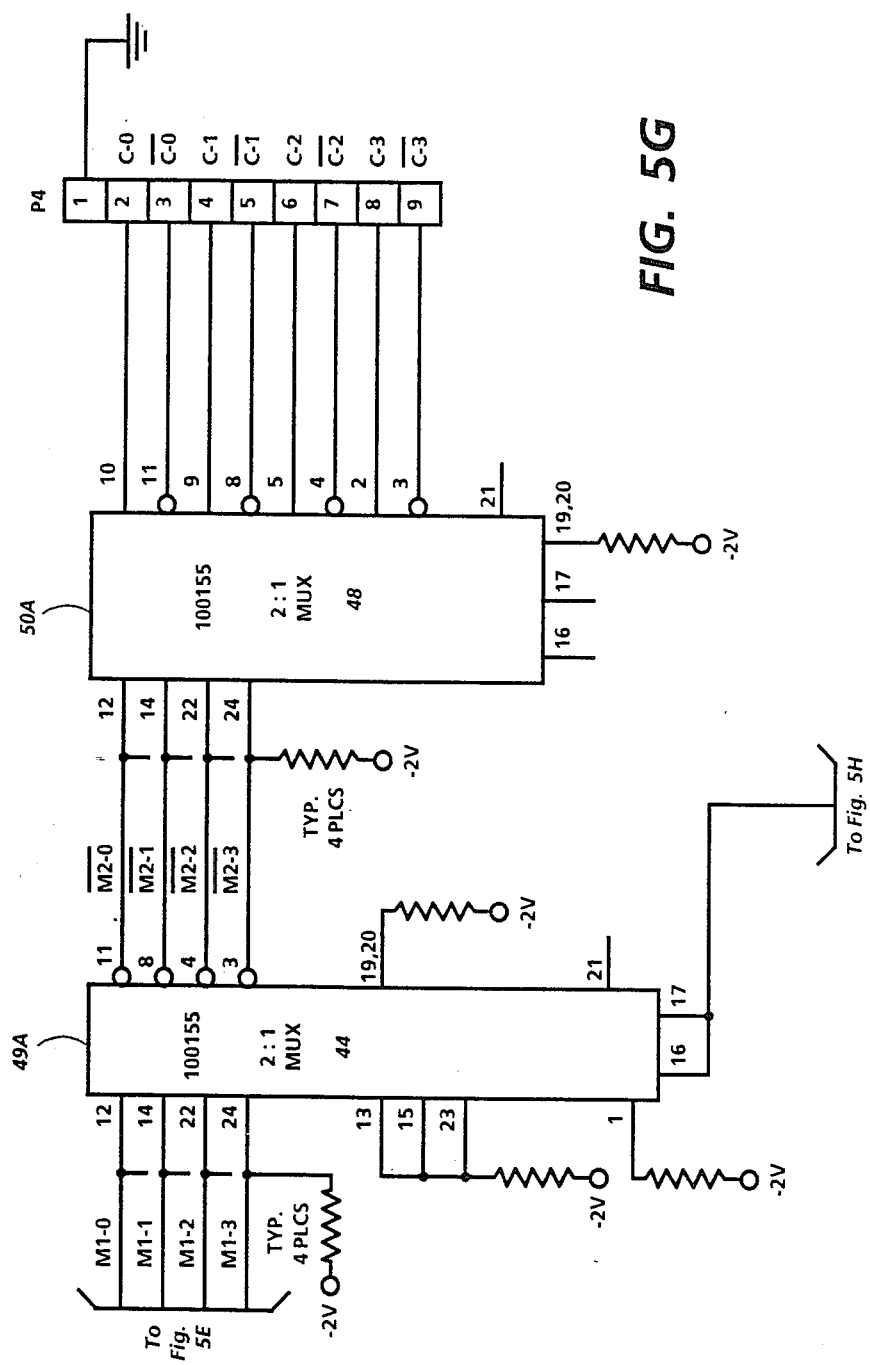
Figure 5H:
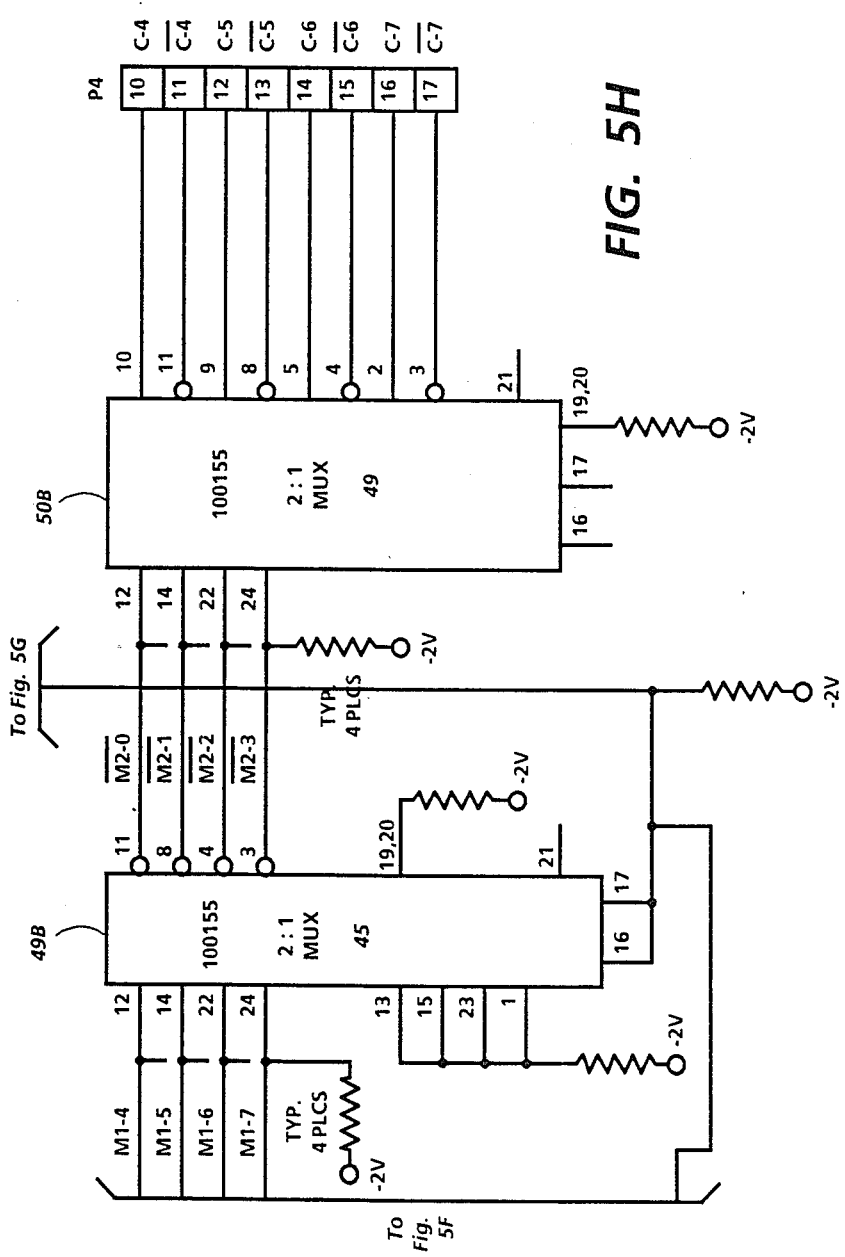

FIG. 3 is one of three identical circuits that supplies either red, green or blue signals to the three channels. There are eight bits of information, each represented by a differential set of inputs, differential signals being used in this case to preserve the leading edges of the waveshapes as a means of maintaining high throughput. Thus, for example, the least significant bit of the input is represented in this figure by the "R0" and "not R0" lines. These eight sets of two inputs are presented to a set of differential input gates 100 through 107, the outputs of which are coupled through buffers 108, 109 to the remainder of the circuit as either positive values or as negative values, as are the corresponding outputs of the other two sets of gates and buffers that supply the green and blue signals. The signal lines are terminated at the end of the lines after being coupled through three boards each. The cabling between boards is arranged so that the red, green and blue signals are wired into the channels either as positive or negative signals depending on whether the channels require them as primary or secondary colors, as shown in the left edge of FIG. 1.

FIG. 4 is a detailed schematic diagram of that portion of FIG. 1 which is beneath the dotted line, which is labelled "#2 Card" and which comprises the two color tables 37 and 44.

In FIG. 4, one input color is supplied as differential input signals C2-0 through C2-7 in both positive and negative form to line receivers 32a through 32h, which correspond to line receiver 32 of FIG. 1. Similarly, the other color is supplied at input pins C3-0 through C3-7, positive and negative, to line receivers 39a through 39h which correspond to line receiver 39 of FIG. 1. The line receiver outputs go to multiplexers 34a, 34b, 41a and 41b, which switch between the actual color signals or test values. Next, the signals are supplied to multiplexers 35a, 35b, 43a and 43b which decide between the the color signals or RAM address data, to be used when initially loading the tables. The output of these multiplexers is connected to the color correction RAMs 37a, 37b, 44a and 44b, which generate the two negative color terms. These terms are coupled through shift registers 38 and 45 to the summer comprising summing devices 46a and 46b, to add the two negative values. The final output, which may be as much as a nine bit number resulting from the addition of two eight bit numbers, is coupled out of the board by multiplexers 51a, 51b and 51c which operate as a nine bit shift register.

FIG. 5 is a schematic diagram of that portion of FIG. 1 above the dotted line, referred to as "#1 Card". The primary color of the channel is received as eight sets of differential inputs C1-0 through C1-7 at the inputs of a line receiver comprising gates 23a through 23h. The output then goes to multiplexer 25a, 25b, which decides between the color input and test value data. The data is then coupled to multiplexer 26a, 26b which switches between RAM 28a-c addresses during table loading or the color values during operation. .

The output from the RAM 28a-c is a ten bit value to preserve accuracy. That is to say, the nine bit negative value of board #2 must be subtracted from the value output by the color correction table 28 without the loss of any least significant bits. Therefore, a ten bit value is output from the Color Correction Table comprising RAM devices 28a, 28b and 28c, and is coupled through the three shift registers 29ab, 30ab and 31ab to the summer 47a and 47b. Unless otherwise noted, shift registers and multiplexers are provided to establish timing relationships.

From this primary color is subtracted the sum of the secondary colors. The sum of these two negative values is input to this board at line receivers 52a through 52i, and from there through shift register 52j to the summer 47a and 47b, the nine bit output of which is coupled through multiplexer 48a, 48b which is wired to prevent underflow, and 49a, 49b, which is wired to prevent overflow. The final device is a multiplexer 50a, 50b, which switches between the color value or a test value.

The above mentioned underflow can occur when there is a small amount of a primary color from which a large amount of secondary color may be subtracted. If left uncorrected, the result would be underflow which would result in a large positive value instead of a zero value. Multiplexer 48a 48b was included to prevent this. Overflow is similarly the addition of two values which would otherwise result in a number greater than 255, and is prevented by multiplexer 49a and 49b. More specifically, the overflow bit is used as the switching input to the multiplexer. If the bit is zero, the multiplexer switches in the color value. If the bit is a one, the multiplexer is forced to use as an input a hard wired maximum positive number. Therefore, in all cases the output is positive. Underflow is similarly prevented by switching between the color value or zero.

Figure 6A:
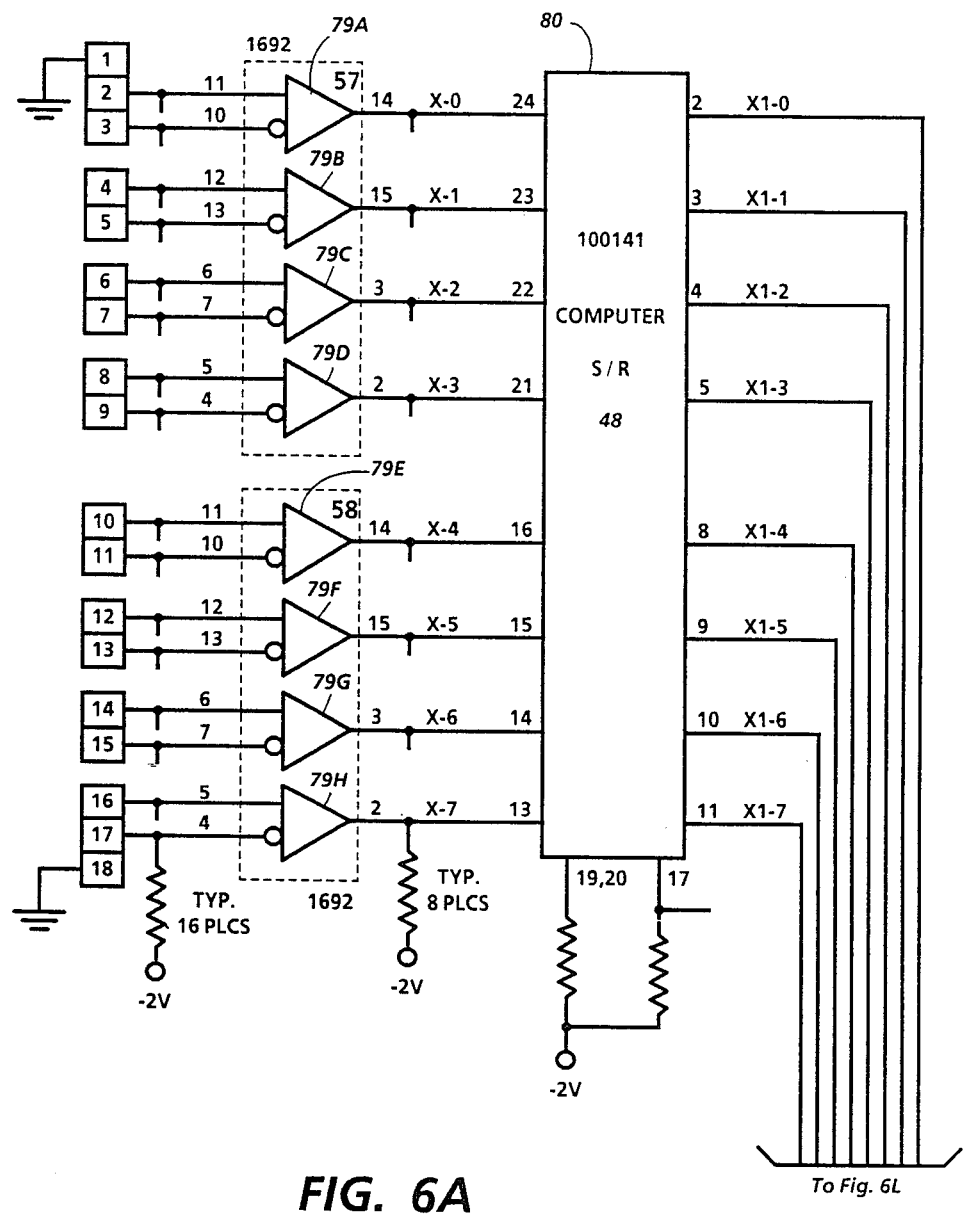
FIGS. 6A–6G is a schematic diagram of the under color removal board.
Figure 6B:
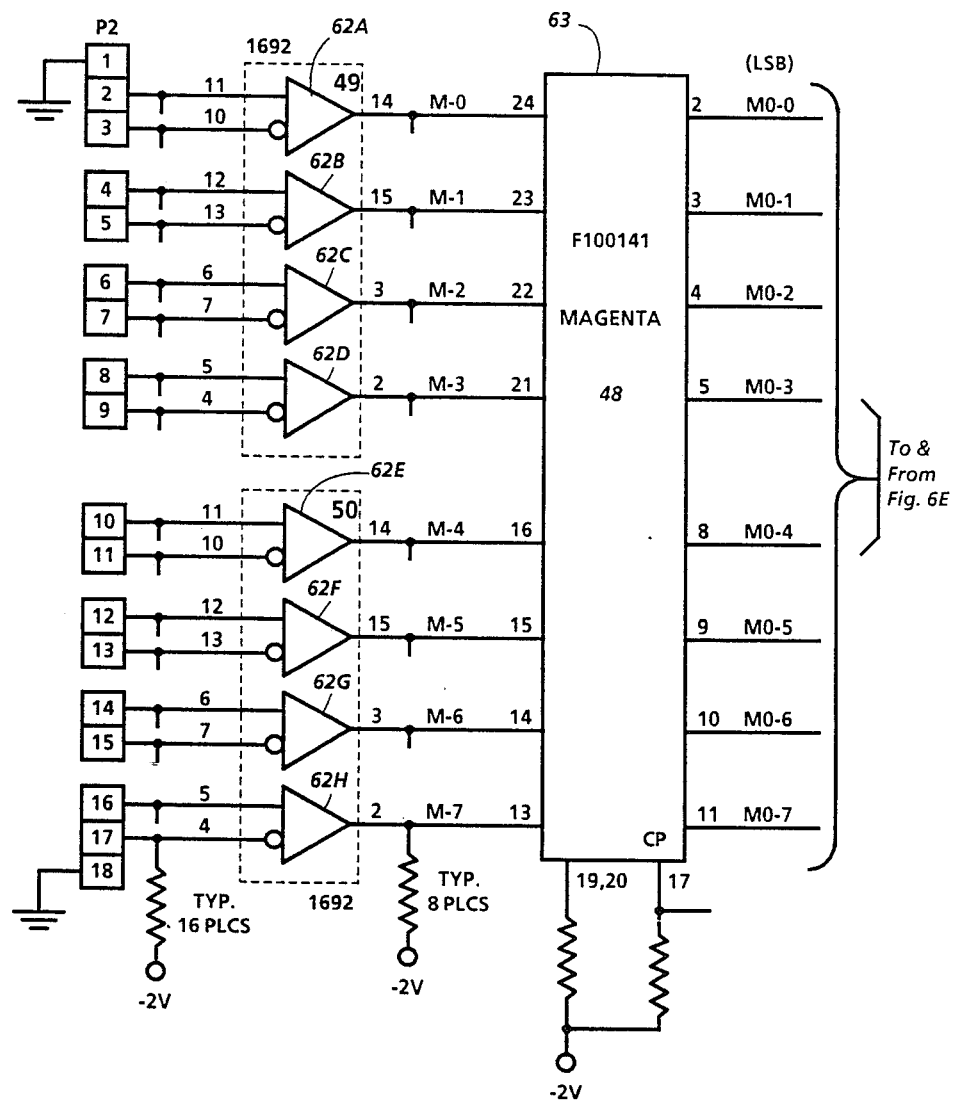
Figure 6C:
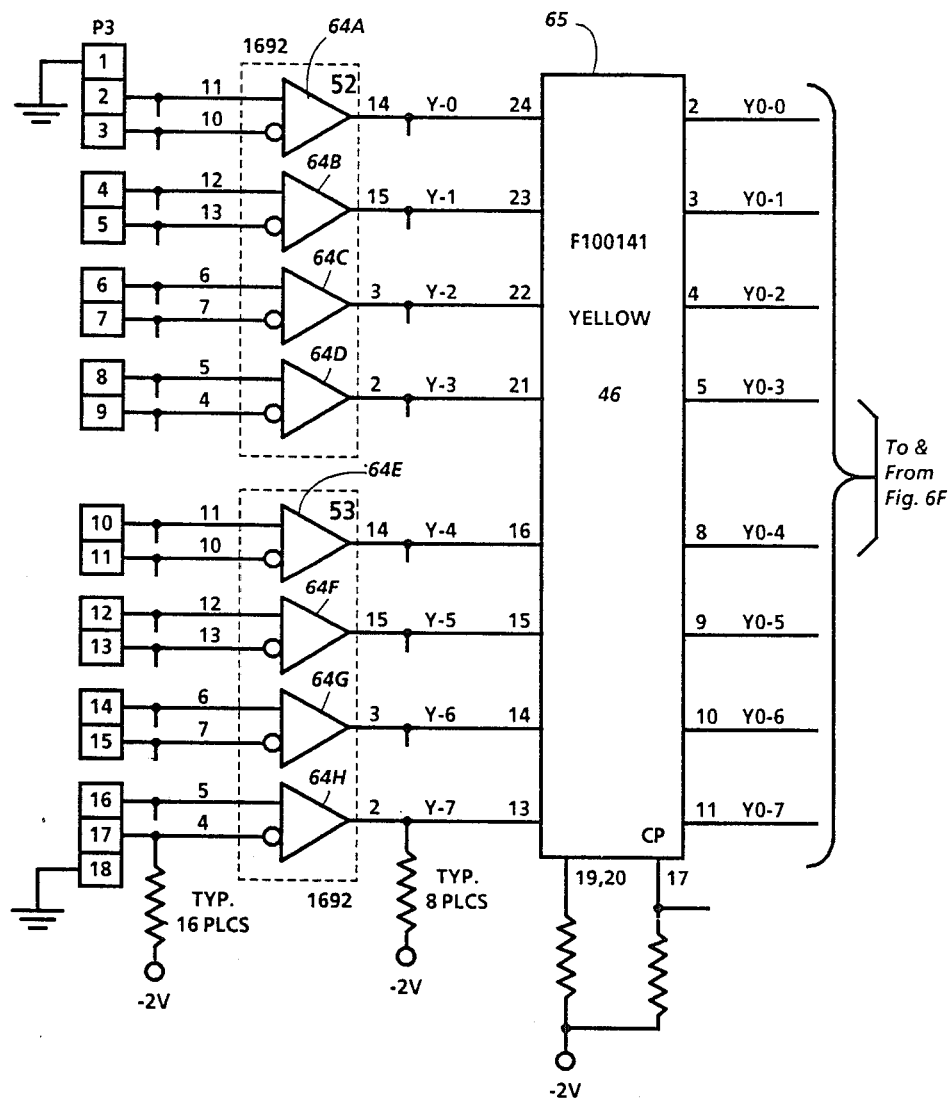
Figure 6D:
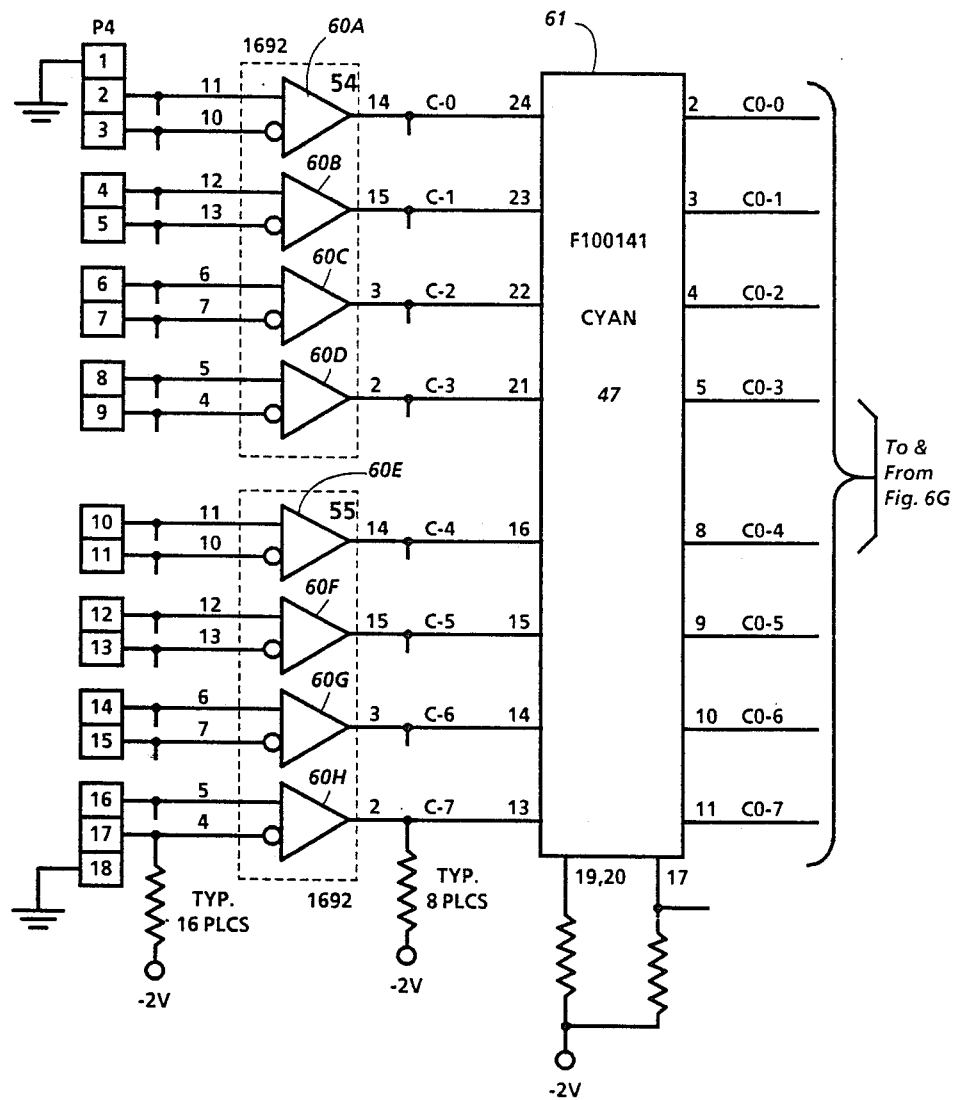
Figure 6E:
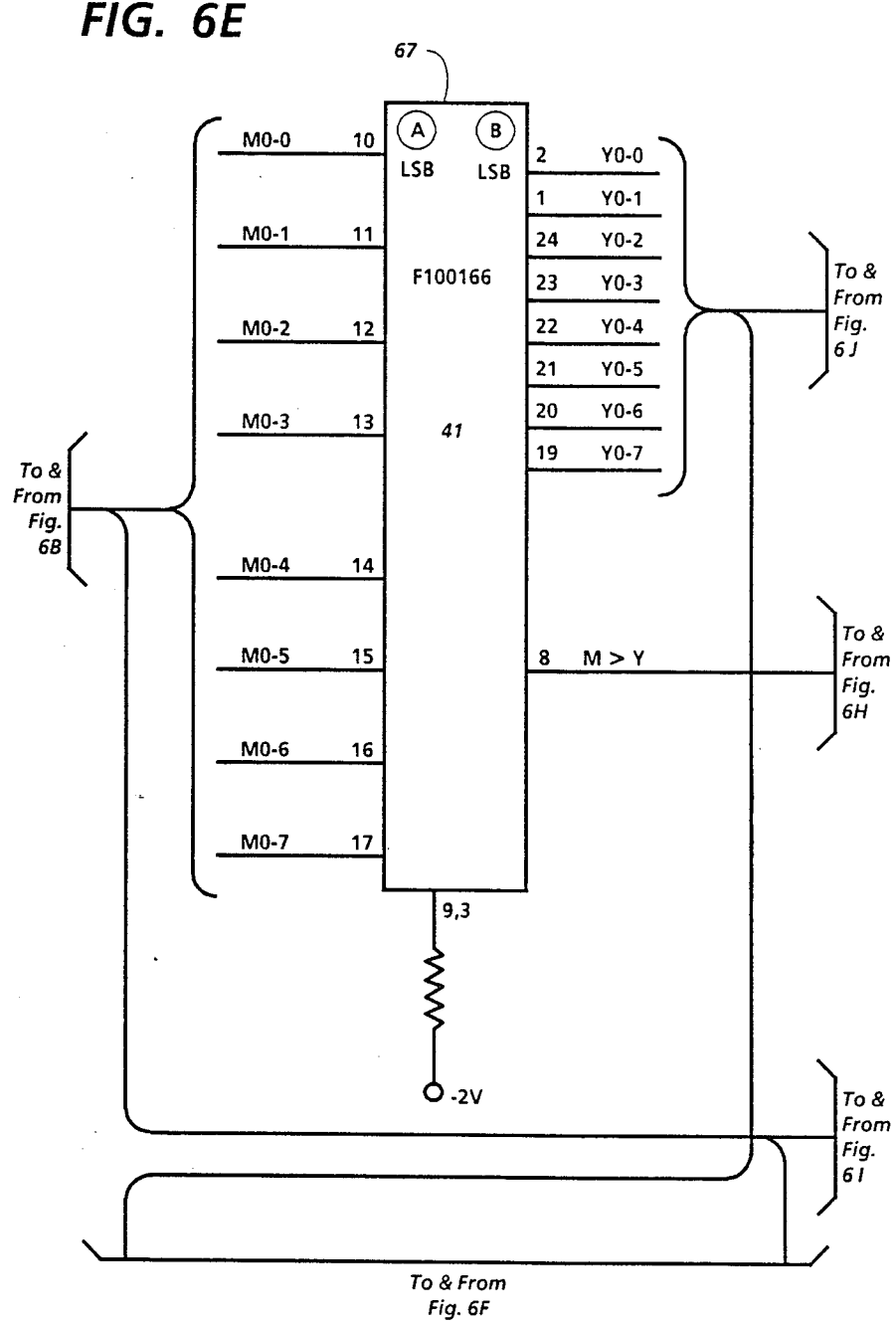
Figure 6F:
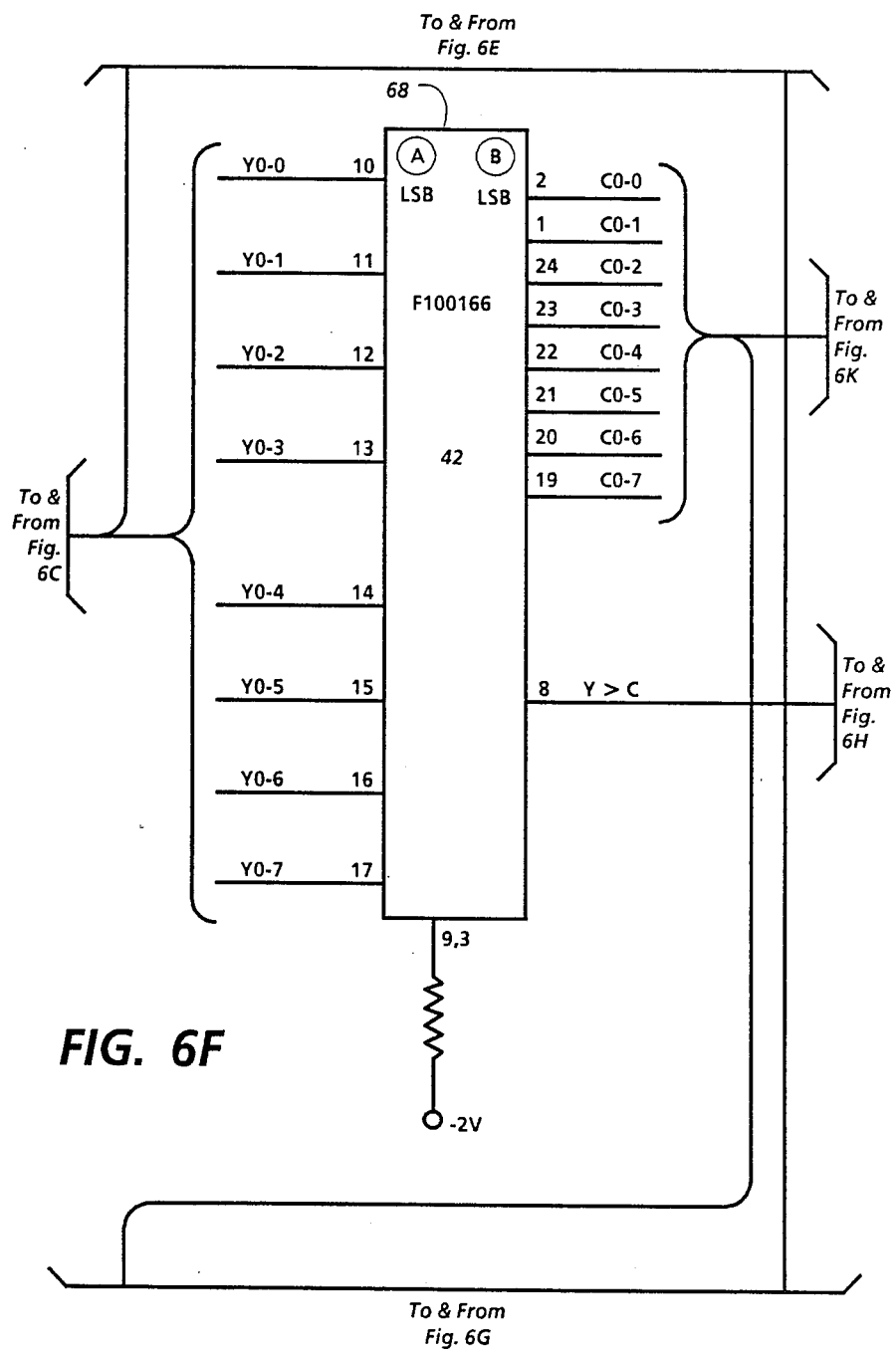
Figure 6G:
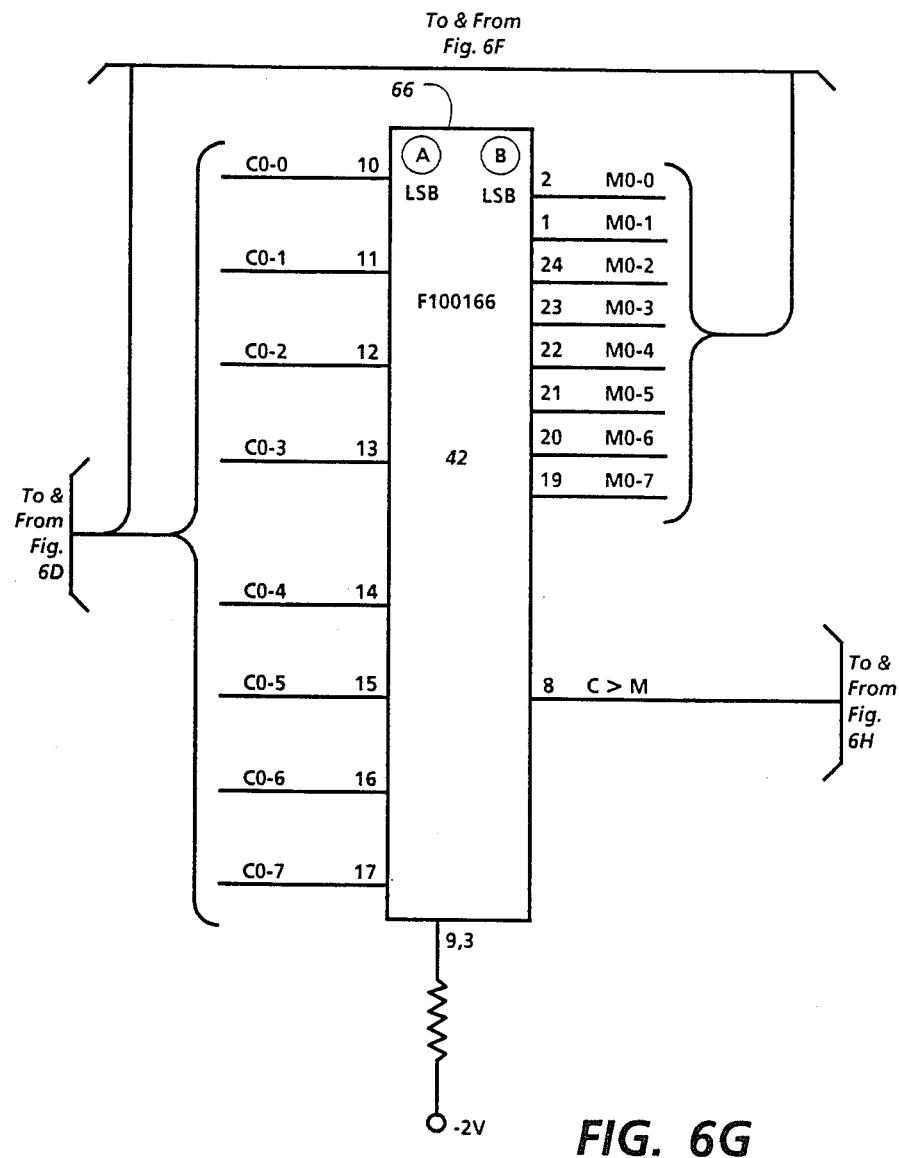
Figure 6H:
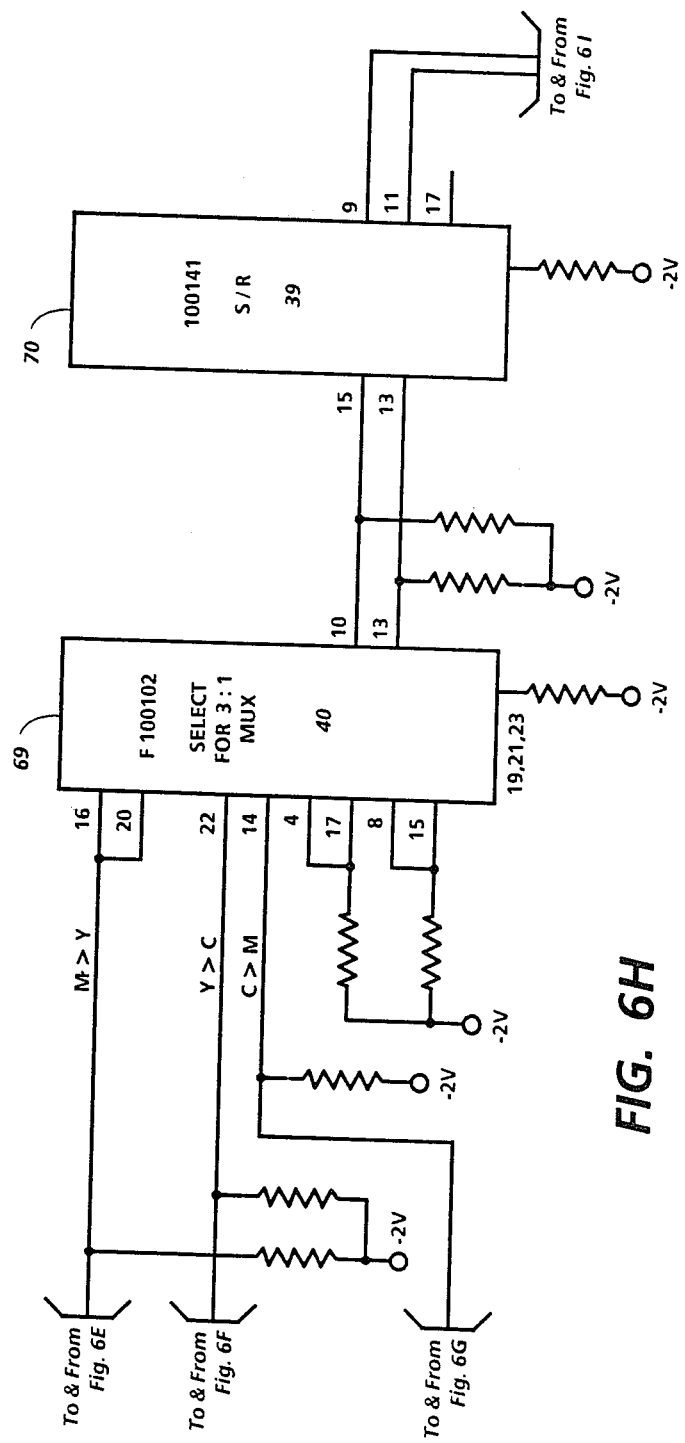
Figure 6I:
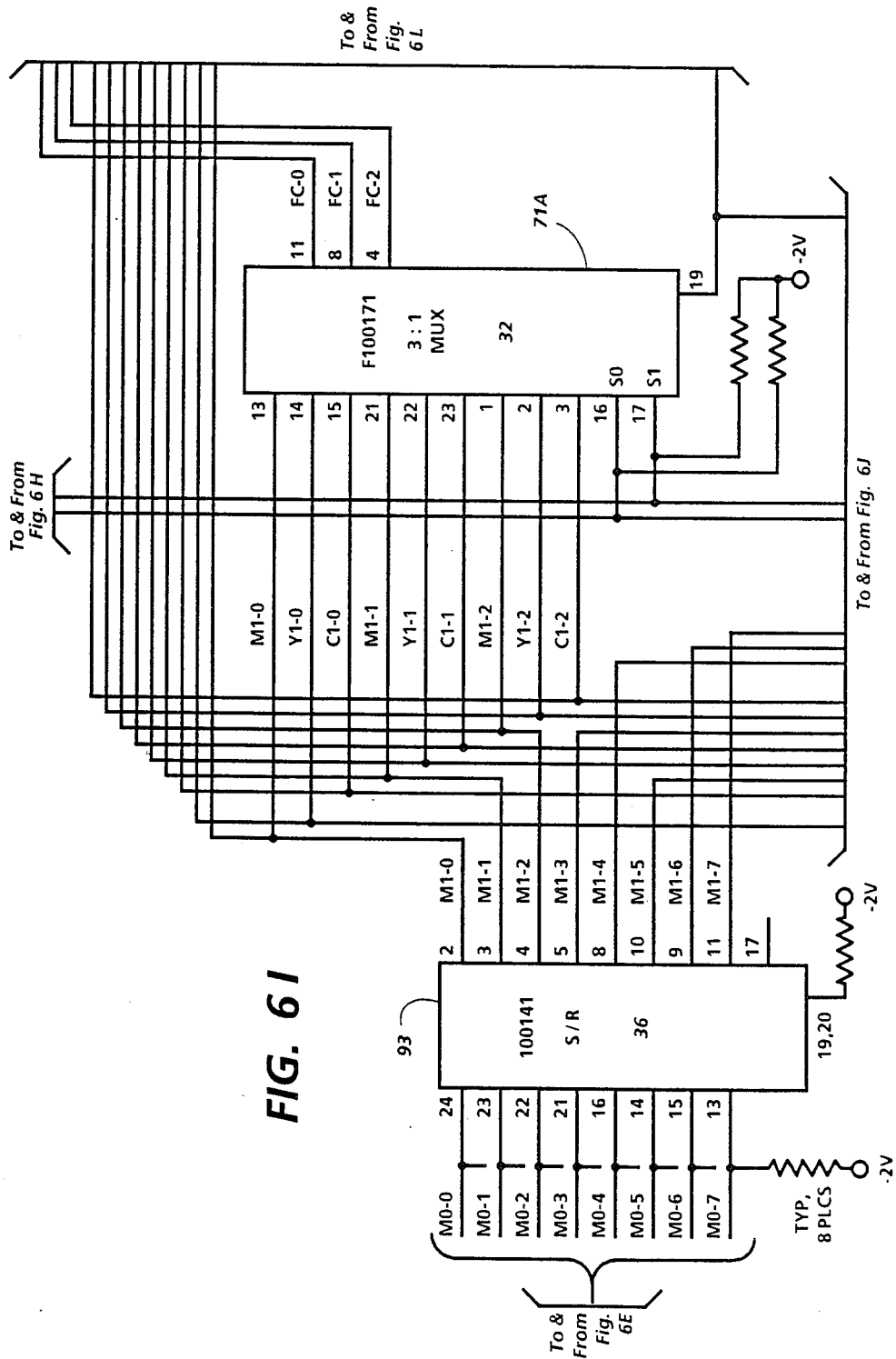
Figure 6J:
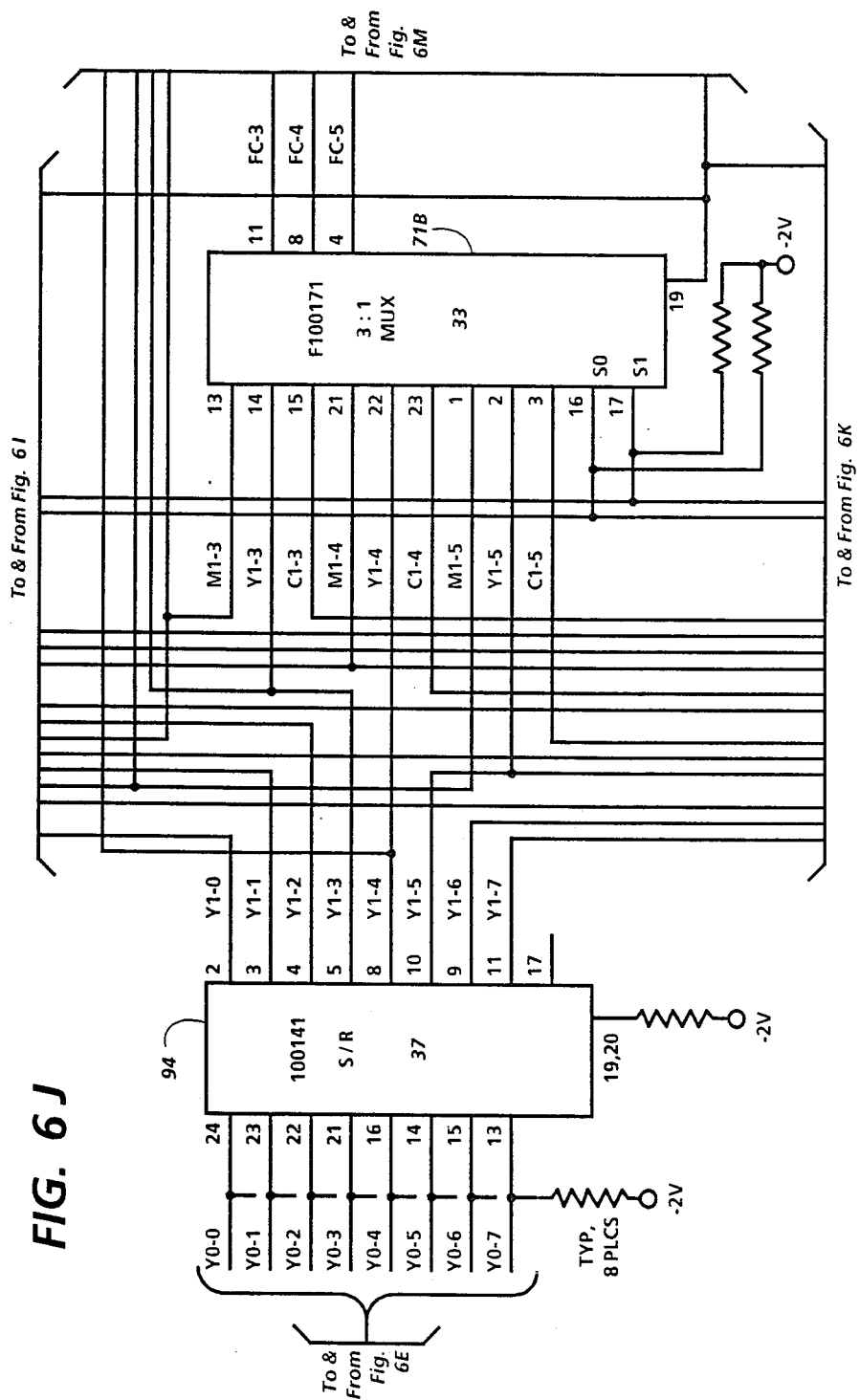
Figure 6K:
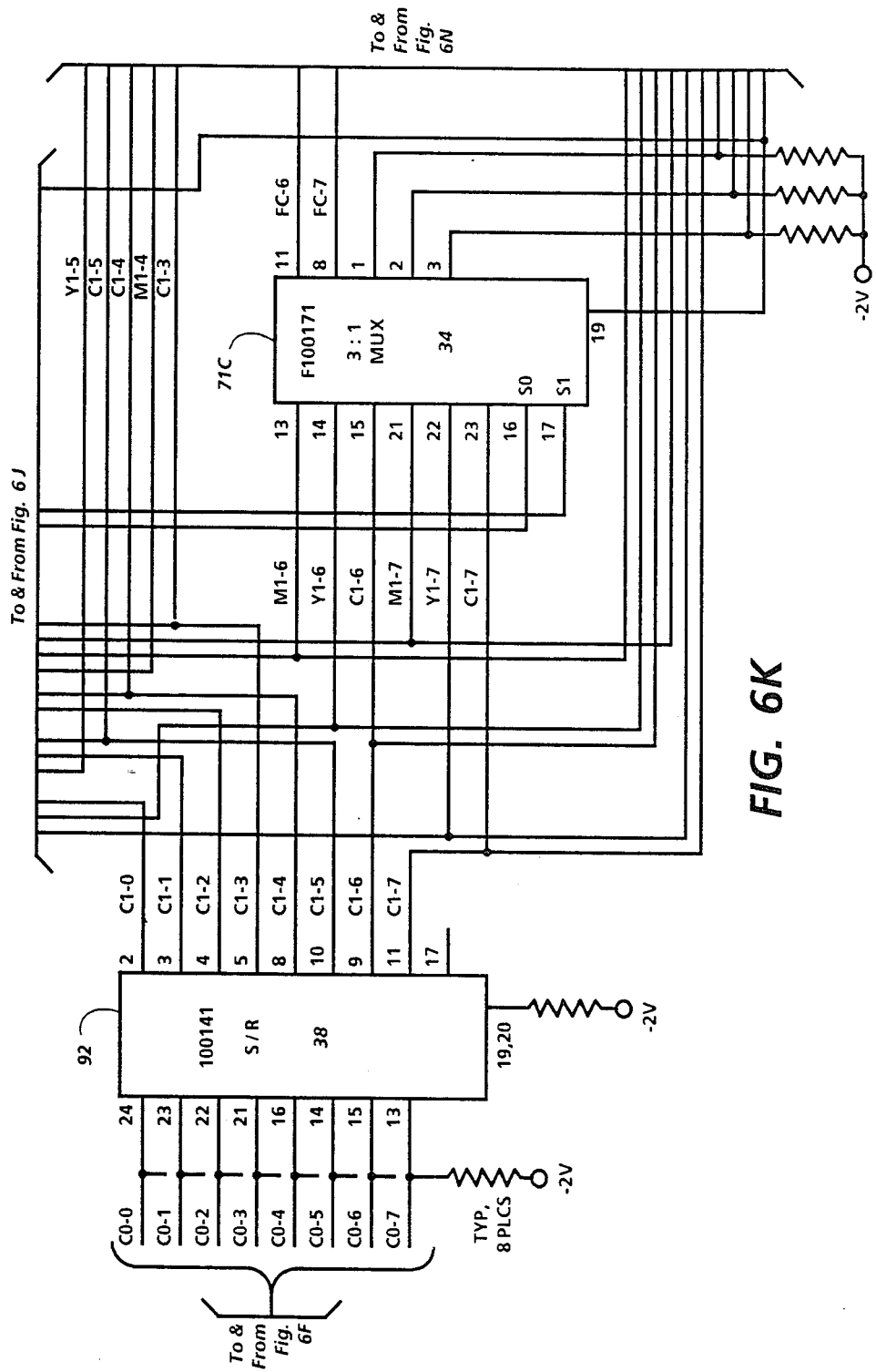
Figure 6L:
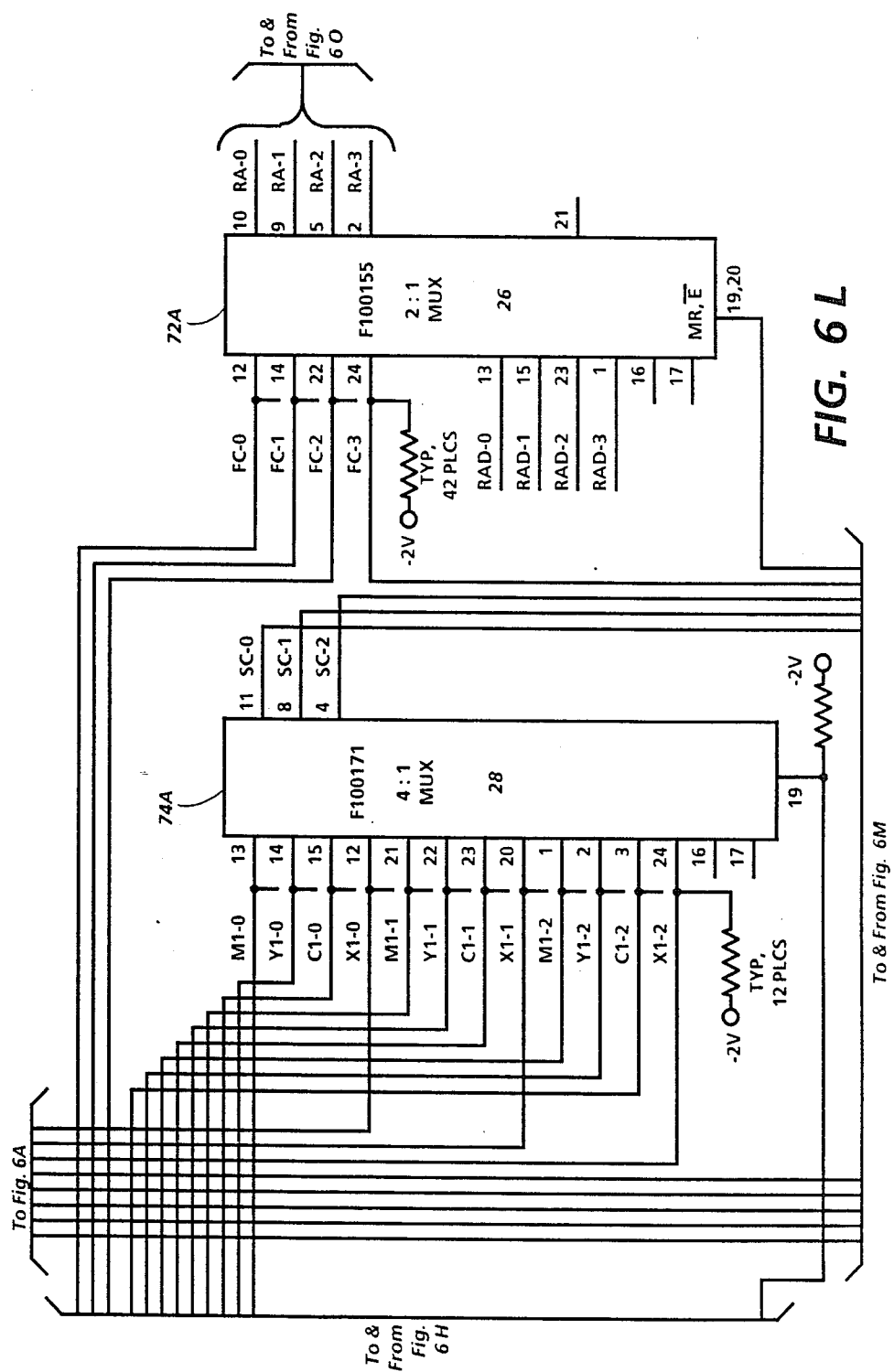
Figure 6N:
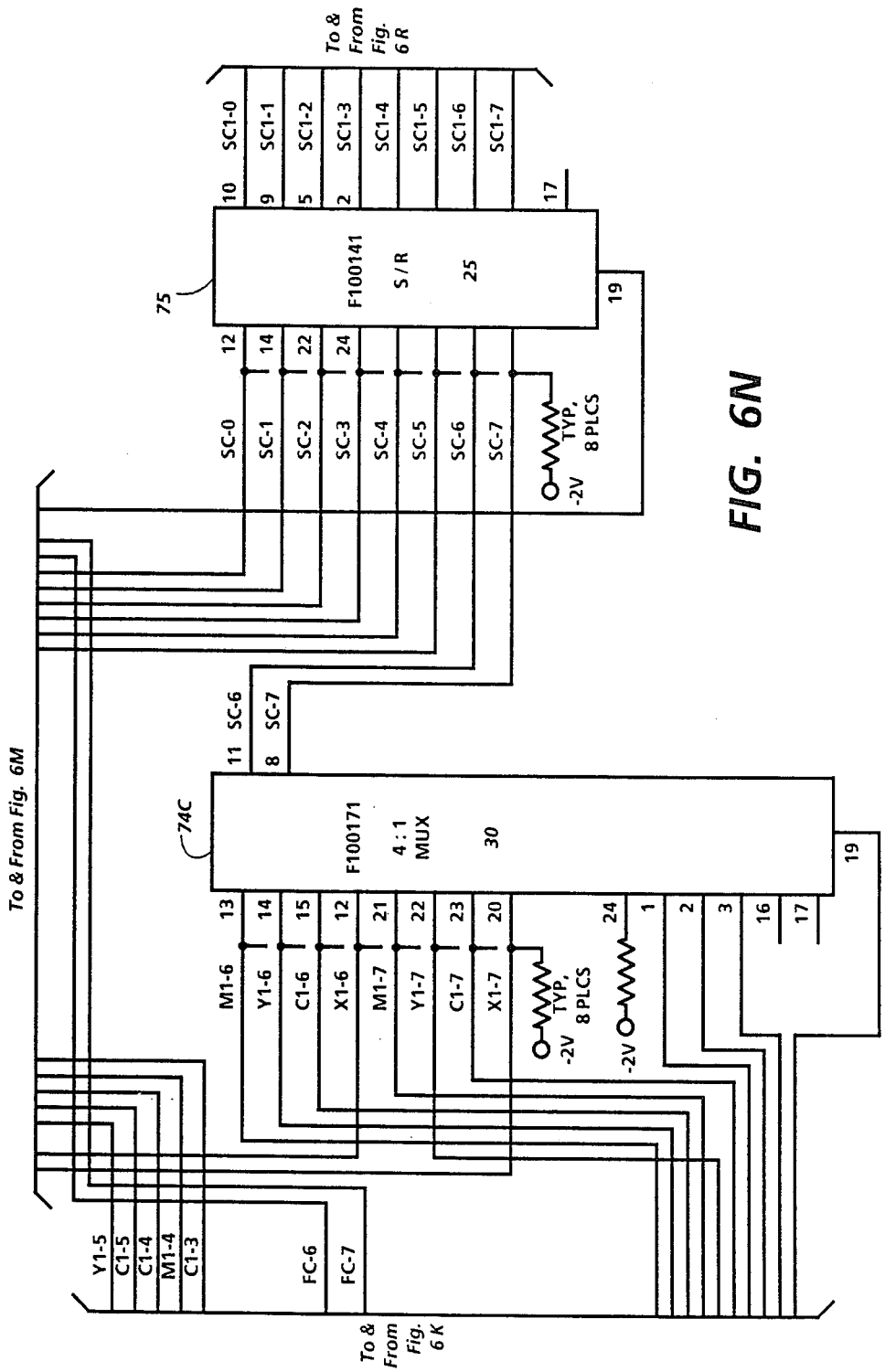
Figure 6:
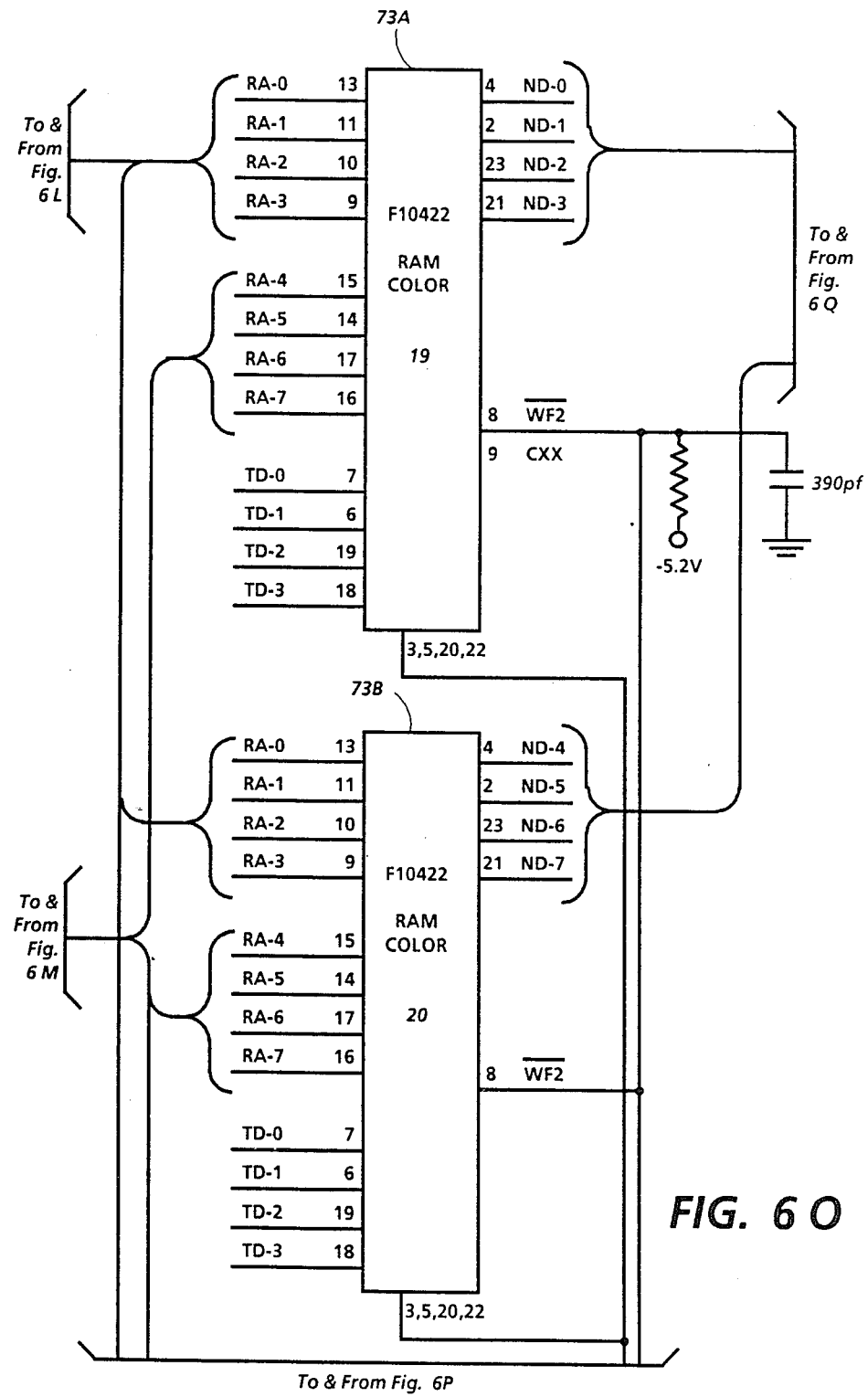
Figure 6P:
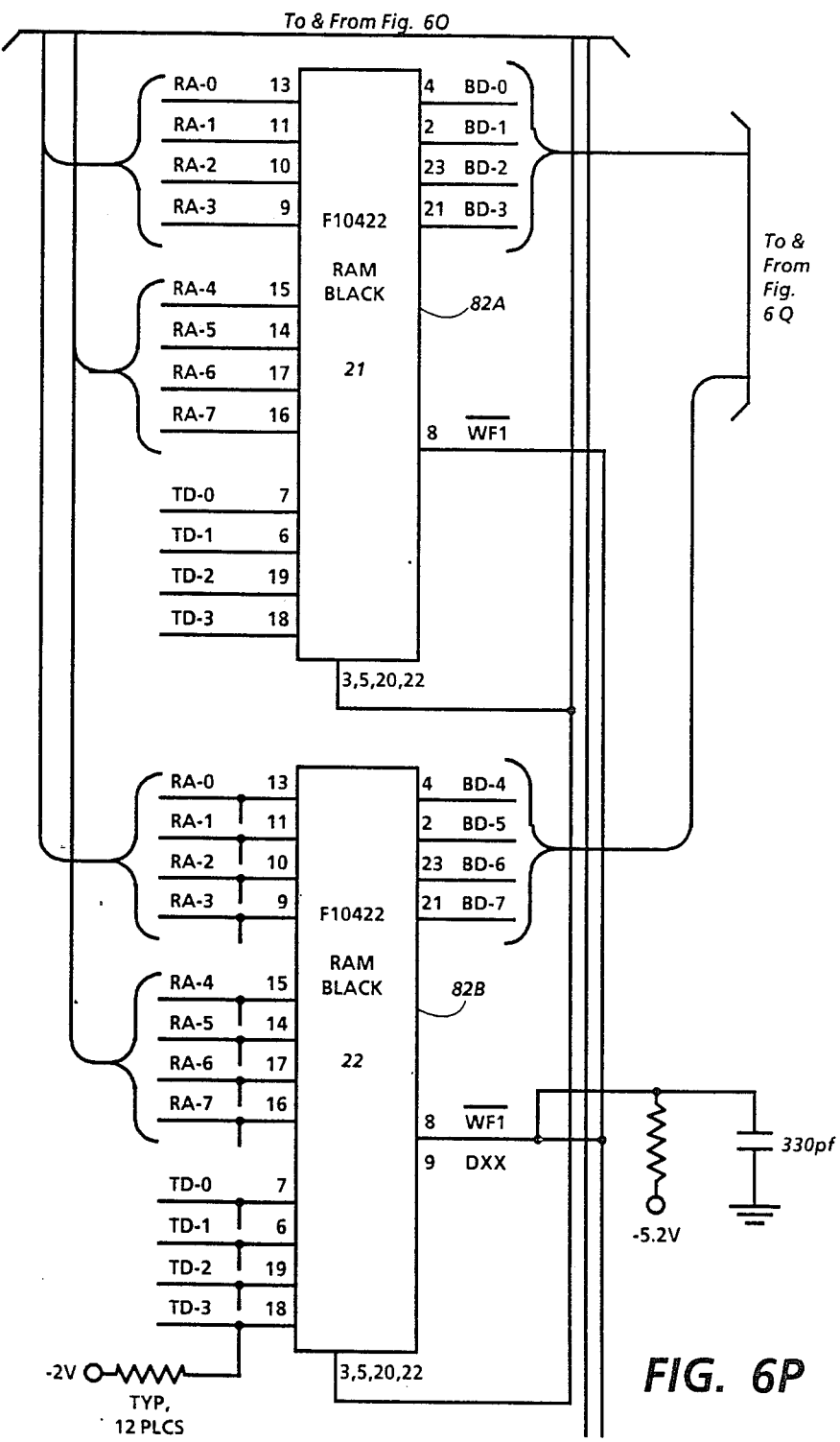
Figure 6Q:
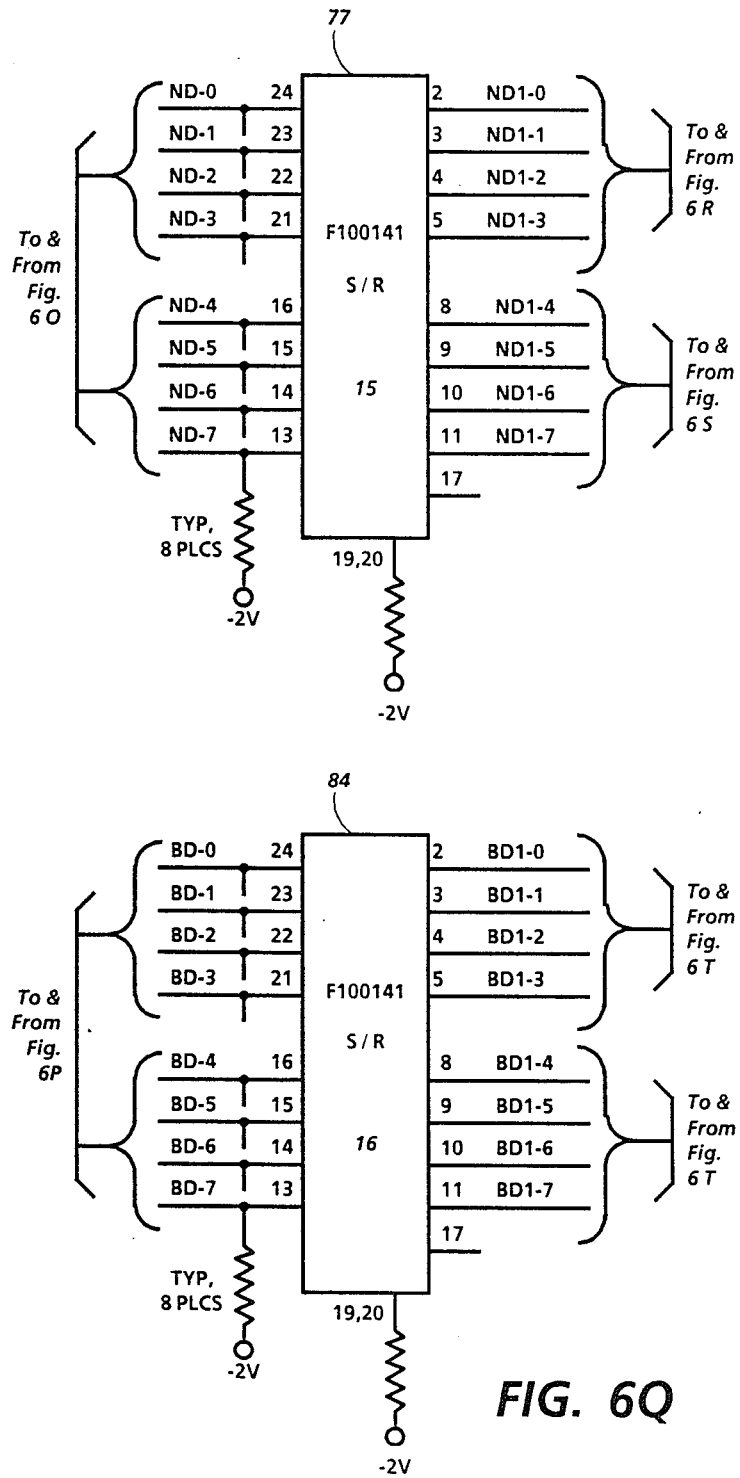
Figure 6R:
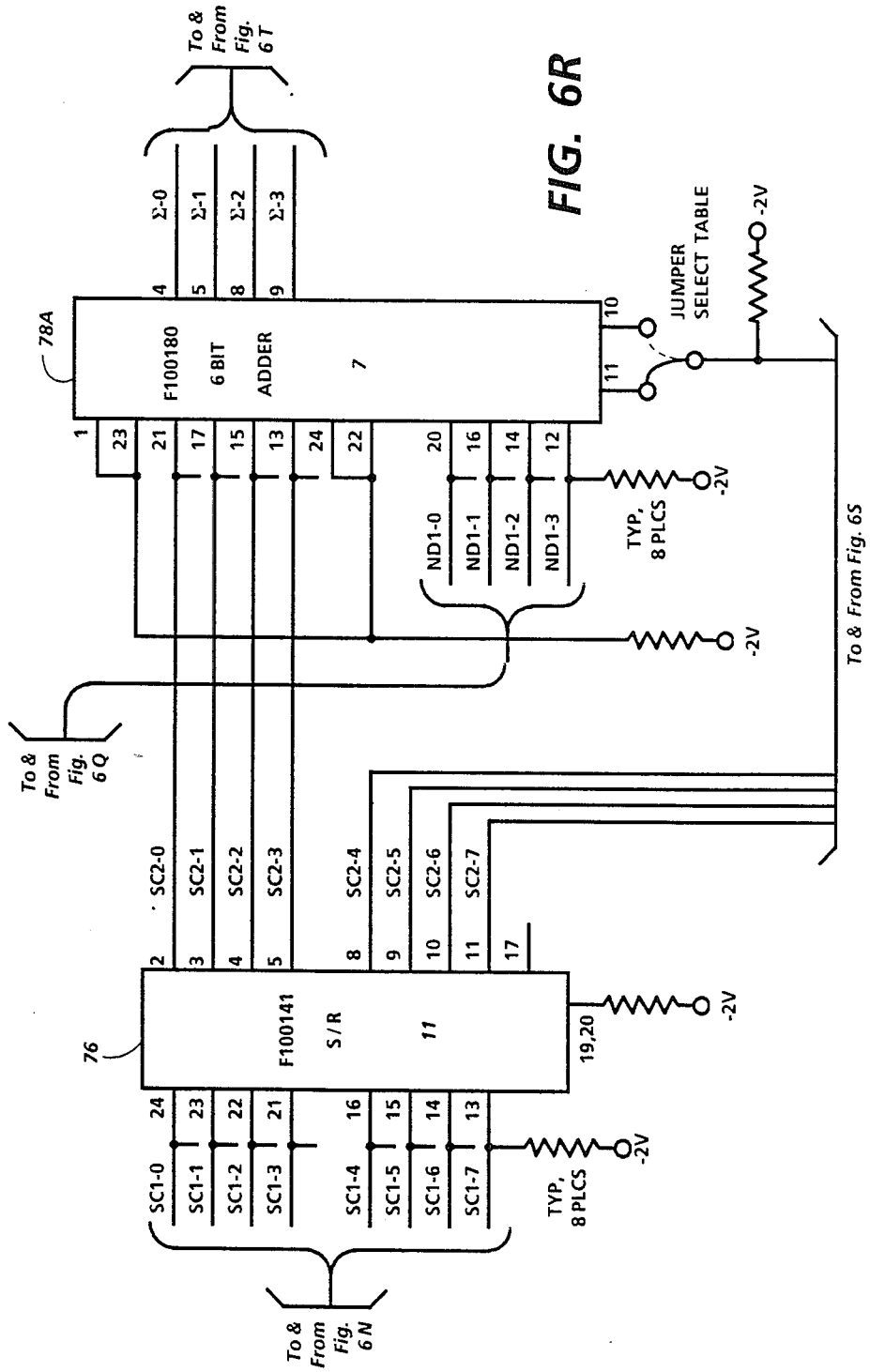
Figure 6S:
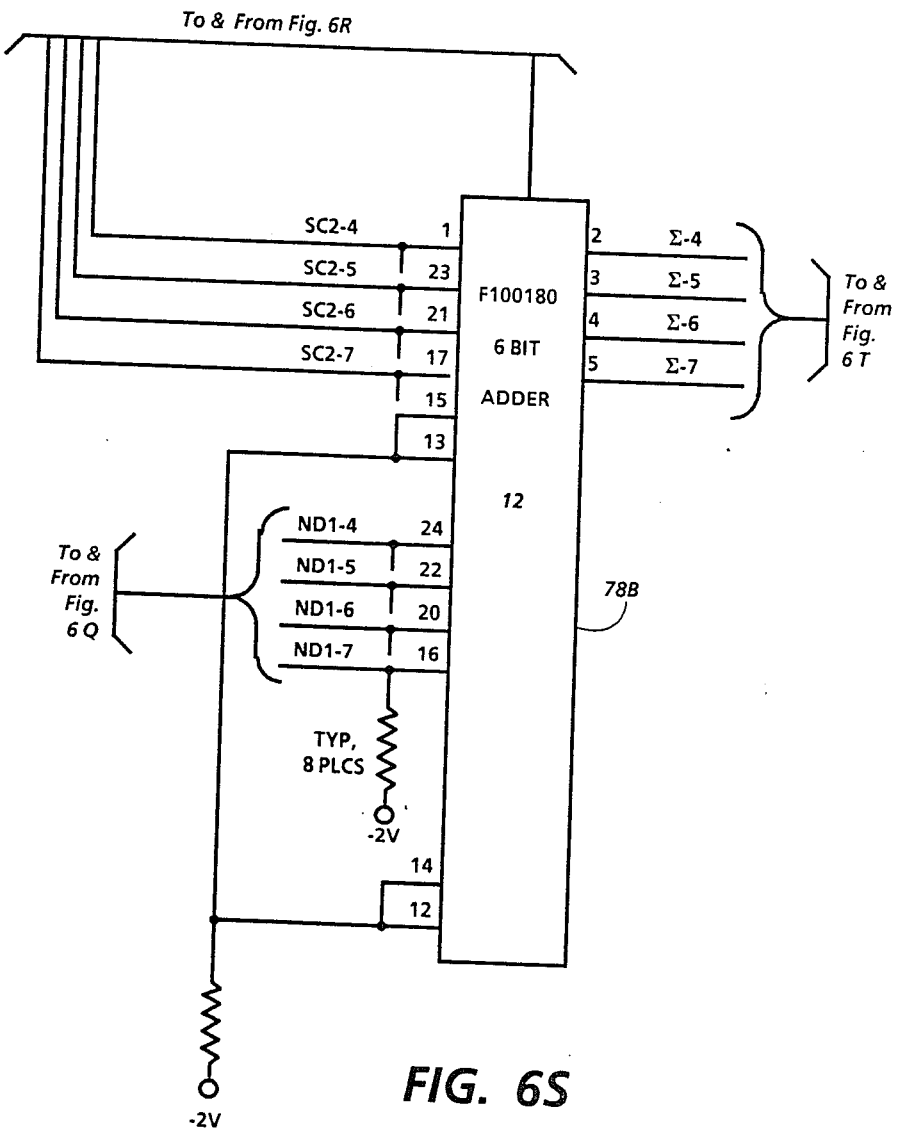
Figure 6T:
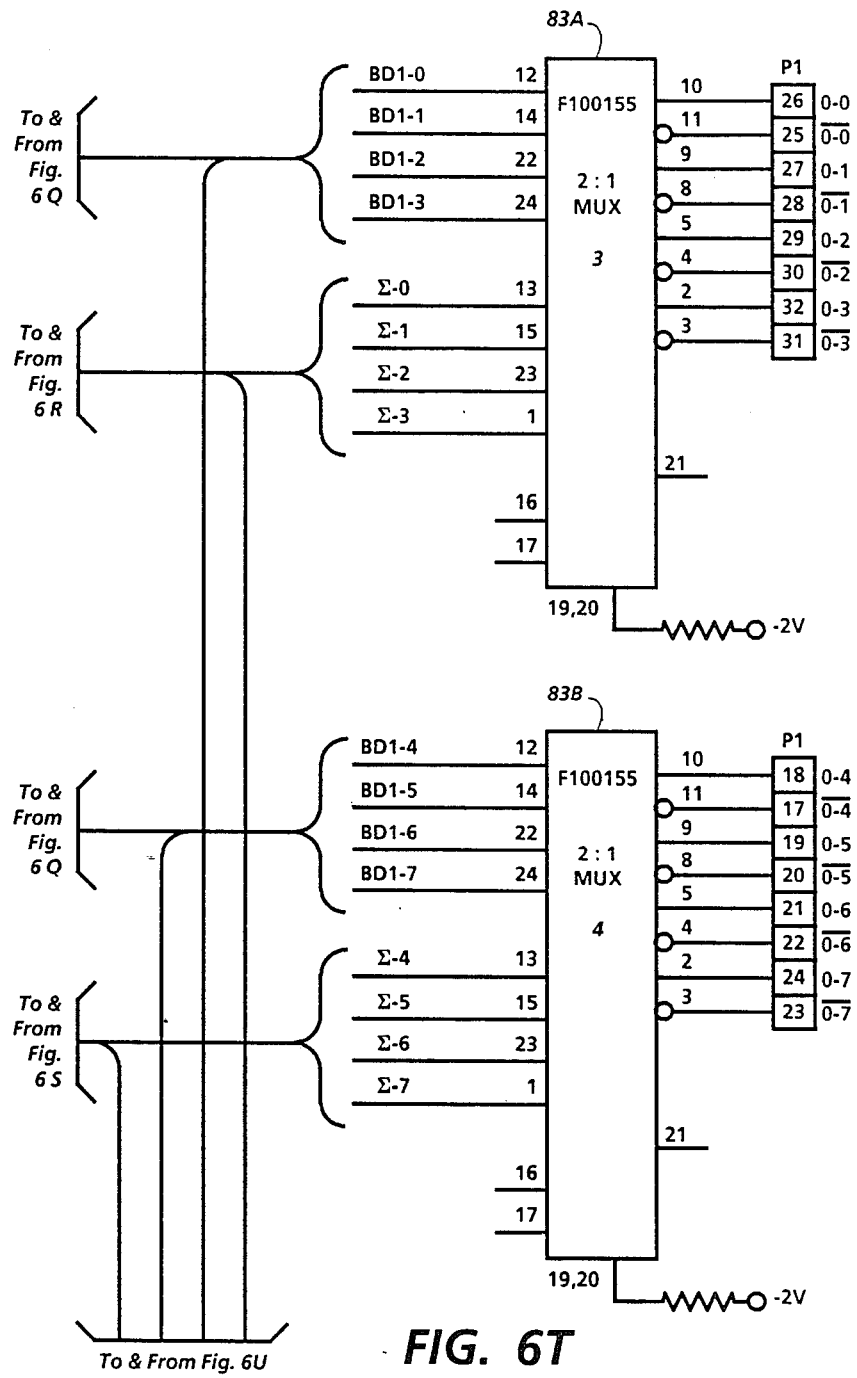
Figure 6U:
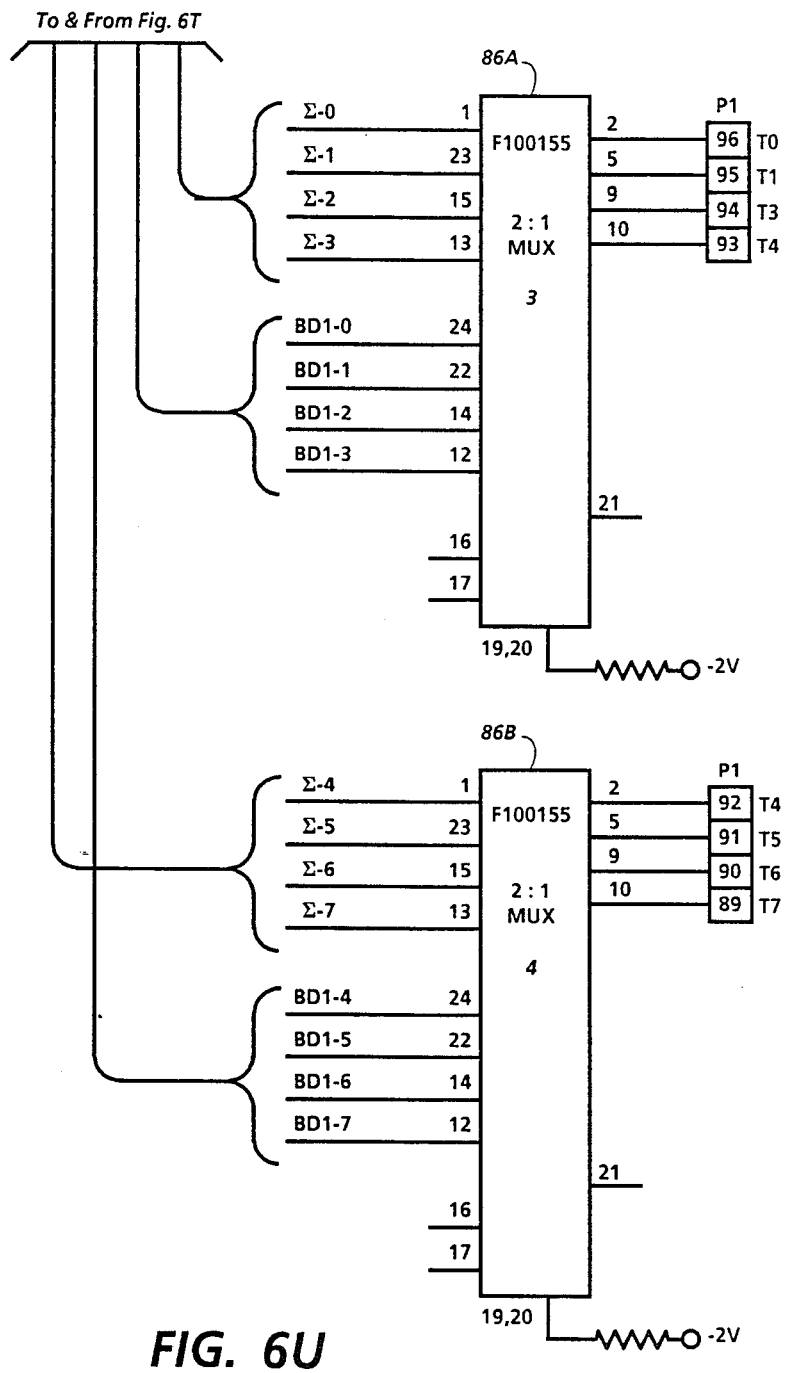

The three sets of color boards output three eight bit digital signal representing cyan, magenta and yellow, all of which go to the under color removal board, a schematic diagram of which is shown as FIG. 6. The cyan signal in the form of eight differential bits is input to line receivers 60a through 60h. Similarly, the magenta signal is input to line receivers 62a–h, and the yellow is received at line receivers 64a–h. The fourth line receiver in the figure, 79a–h receives the solid color computer-generated graphics signal. The four signals are coupled through shift registers 80, 61, 63 and 65, and then the three color signals are input to the comparators 66, 67, 68, which all operate in an identical manner. Using comparator 67 as an example, in the schematic, an eight bit magenta signal is applied to the left inputs, an eight bit yellow signal is applied to the right inputs, and one output line pin 8 goes high or low to indicated which is greater, the higher number indicating less ink. The three comparator output lines goe to the multiplexer 69 which produces a two bit output identifying the color having the least ink. This output is coupled through shift register 70, and is then used to control multiplexer 71a–c.

At the same time, the three eight bit color values from shift registers 61, 63 and 65 are coupled through shift registers 92, 93 and 94 and are applied to the inputs of the same multiplexer 71a–c, which, under the control of the two lines from shift register 70, outputs the eight bit signal corresponding to the amount of least ink of the three color signals. This signal is then coupled through multiplexer 72a, 72b which switches between this color signal or address data for loading the RAMs 73, 82, and is then used as an input to the color table RAM 73, the output of which is a number corresponding to the amount of ink that should be removed from all three color channels. This number is coupled through shift register 77, and becomes one input to the adder 78a, 78b.

At the same time, the three color signals that are coupled through shift registers 92, 93 and 94, and the computer generated black signal which is coupled through line receivers 79a through 79h, are used as inputs to the multiplexer 74a–c, which is controlled to select the color currently being printed. This output is coupled through shift registers 75 and 76 and becomes the other input to adder 78a, 78b, which is actually wired to subtract the two input values. The result is that the amount of ink that must be removed is subtracted from the color currently being printed to result in the final amount of ink to be used to print the current dot. This final value, which is the output of adder 78a, 78b, is coupled out through multiplexer 83a, 83b, which can switch between this color signal from RAM 73 or the black signal from RAM 82.

In case the color printer is going through a black print revolution, the least ink signal output from shift register 72 is used as an input to the black table RAM 82a, 82b, the output of which is the amount of black ink to be used. This system is implemented so that the amount of ink removed from the three color channels may be different from the amount of black ink used during the black cycle. To the extent that these numbers must be different, the second RAM 82a, 82b, is used to hold this second set of values. These do not go through any further conditioning, but are coupled directly out through shift register 84, and the output multiplexer 83a, 83b. A second multiplexer 86a, 86b, is used to switch the output signals to an A/D converter for the convenience of the test operator.

This system may be used without under color removal. That is, the cyan, magenta and yellow outputs from the circuit of FIG. 1 can be used directly to drive the printer.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A copier circuit for converting first, second and third raster input scanner color signals into an ink signal representing an amount of ink needed to print a dot on a color copy comprising:

first, second and third means for converting said first, second and third color signals into first, second and third functions of said first, second and third signals by multiplying each signal by its own factor, fourth, fifth and sixth means for converting said second, third and first color signals into fourth, fifth and sixth functions of said second, third and first color signals by multiplying each signal by its own factor, seventh, eighth and ninth means for converting said third, first and second color signals into seventh, eighth and ninth functions of said third, first and second color signals by multiplying each signal bit its own factor, first means for substracting said second and third functions from said first function to produce a first ink signal, second means for subtracting said fifth and sixth functions from said fourth function to produce a second ink signal, third means for subtracting said eighth and ninth functions from said seventh function to produce a third ink signal.

means for comparing said first, second and third ink signals and outputting a signal representing a least amount of ink.

means for selecting one of said first, second or third ink signals as an ink to be printed as the current dot, means for substracting said least amount of ink signal from said selected current dot ink signal to determine an amount of the selected ink to be printed.

2. The circuit of claim 1 wherein said first through ninth means are RAMs.

3. The circuit of claim 1 wherein said first, second and third color signals represent red, green and blue and said first, second and third ink signals represent cyan, magenta and yellow.

* * * * *